US008463061B2

(12) United States Patent
Takada

(10) Patent No.: US 8,463,061 B2
(45) Date of Patent: Jun. 11, 2013

(54) ENCODING AND DECODING TWO-DIMENSIONAL SIGNAL USING A WAVELET TRANSFORM

(75) Inventor: Jun Takada, Tokyo (JP)

(73) Assignee: NEC Corporation, Tokyo (JP)

( * ) Notice: Subject to any disclaimer, the term of this patent is extended or adjusted under 35 U.S.C. 154(b) by 1097 days.

(21) Appl. No.: 12/309,227

(22) PCT Filed: Jul. 13, 2007

(86) PCT No.: PCT/JP2007/063952
§ 371 (c)(1),
(2), (4) Date: Jan. 12, 2009

(87) PCT Pub. No.: WO2008/007760
PCT Pub. Date: Jan. 17, 2008

(65) Prior Publication Data
US 2009/0324116 A1   Dec. 31, 2009

(30) Foreign Application Priority Data
Jul. 13, 2006   (JP) .................................. 2006-192494

(51) Int. Cl.
*G06K 9/46*   (2006.01)
*H04N 7/12*   (2006.01)
(52) U.S. Cl.
USPC ..................................... 382/240; 375/240.11
(58) Field of Classification Search
USPC ..................................... 382/240; 375/240.11
See application file for complete search history.

(56) References Cited

U.S. PATENT DOCUMENTS

| 5,396,237 | A | * | 3/1995 | Ohta ............................. 341/50 |
| 5,412,429 | A | * | 5/1995 | Glover ..................... 375/240.11 |
| 5,434,567 | A | * | 7/1995 | Mack et al. ..................... 341/50 |
| 5,568,598 | A | * | 10/1996 | Mack et al. ..................... 345/639 |
| 5,682,152 | A | * | 10/1997 | Wang et al. ..................... 341/50 |
| 5,748,786 | A | * | 5/1998 | Zandi et al. ................... 382/240 |
| 5,764,802 | A | * | 6/1998 | Simon .......................... 382/236 |
| 5,808,683 | A | * | 9/1998 | Tong et al. ............... 375/240.11 |

(Continued)

FOREIGN PATENT DOCUMENTS

| JP | 05-284368 | 10/1993 |
| JP | 11-046372 | 2/1999 |

(Continued)

OTHER PUBLICATIONS

S. Matsumura et al., "Wavelet Image Coding Using Power Adaptive Vector Quantization," 1995 Image Coding Symposium (PCSJ95), pp. 121-122.

(Continued)

*Primary Examiner* — Wenpeng Chen
(74) *Attorney, Agent, or Firm* — Foley & Lardner LLP

(57) ABSTRACT

Encoding and decoding devices and methods are provided. All the components of LH, HL, HH sub-band coefficients of the same hierarchy and the same space coordinate are extracted as a set from a wavelet sub-band space. Furthermore, it is judged whether each component of each coefficient is zero and as 1-bit judgment result, the respective judgment results are combined to obtain multi-bit flag information. Upon encoding, firstly, the Huffman information is subjected to variable-length encoding by the Huffman encoding code. After this, only the coefficient values which are not zero are similarly subjected to the variable-length encoding by the Huffman code or the like and outputted.

34 Claims, 16 Drawing Sheets

U.S. PATENT DOCUMENTS

| | | | | |
|---|---|---|---|---|
| 5,982,434 | A * | 11/1999 | Tong et al. | 375/240.11 |
| 6,067,383 | A * | 5/2000 | Taniguchi et al. | 382/240 |
| 6,148,111 | A * | 11/2000 | Creusere | 382/240 |
| 6,208,692 | B1 * | 3/2001 | Song et al. | 375/240.19 |
| 6,236,762 | B1 * | 5/2001 | Chui et al. | 382/250 |
| 6,259,735 | B1 * | 7/2001 | Aono et al. | 375/240.11 |
| 6,289,131 | B1 * | 9/2001 | Ishikawa | 382/240 |
| 6,356,665 | B1 * | 3/2002 | Lei et al. | 382/240 |
| 6,487,318 | B1 * | 11/2002 | Cho | 382/240 |
| 6,487,319 | B1 * | 11/2002 | Chai | 382/240 |
| 6,728,316 | B2 * | 4/2004 | Enficiaud et al. | 375/240.19 |
| 6,735,342 | B2 * | 5/2004 | Felts et al. | 382/240 |
| 6,813,314 | B2 * | 11/2004 | Aono et al. | 375/240.11 |
| 6,898,324 | B2 * | 5/2005 | Pesquet-Popescu | 382/240 |
| 6,934,418 | B2 * | 8/2005 | Okada | 382/240 |
| 7,120,306 | B2 | 10/2006 | Okada et al. | |
| 7,127,111 | B2 * | 10/2006 | Fukuhara et al. | 382/232 |
| 7,308,147 | B2 * | 12/2007 | Sano | 382/236 |
| 7,426,303 | B2 * | 9/2008 | Nozu | 382/232 |
| 7,447,369 | B2 * | 11/2008 | Gormish et al. | 382/235 |
| 7,454,069 | B2 * | 11/2008 | Kodama et al. | 382/232 |
| 7,474,792 | B2 * | 1/2009 | Kadowaki et al. | 382/232 |
| 7,477,792 | B2 * | 1/2009 | Wu et al. | 382/240 |
| 7,505,630 | B2 * | 3/2009 | Sakuyama et al. | 382/233 |
| 2001/0003544 | A1 * | 6/2001 | Kajiwara et al. | 382/240 |
| 2002/0009142 | A1 * | 1/2002 | Aono et al. | 375/240.11 |
| 2002/0009232 | A1 * | 1/2002 | Sodagar et al. | 382/232 |
| 2002/0009233 | A1 * | 1/2002 | Pesquet-Popescu | 382/240 |
| 2002/0118759 | A1 * | 8/2002 | Enficiaud et al. | 375/240.19 |
| 2003/0068089 | A1 * | 4/2003 | Sano et al. | 382/232 |
| 2003/0198391 | A1 * | 10/2003 | Fukuhara et al. | 382/232 |
| 2004/0165780 | A1 | 8/2004 | Maki et al. | |
| 2005/0002574 | A1 * | 1/2005 | Fukuhara et al. | 382/232 |
| 2005/0012645 | A1 * | 1/2005 | Funakubo | 341/50 |
| 2005/0025239 | A1 * | 2/2005 | Aono et al. | 375/240.11 |
| 2005/0063470 | A1 | 3/2005 | Bottreau et al. | |
| 2005/0084132 | A1 * | 4/2005 | Wee et al. | 382/100 |
| 2005/0163388 | A1 * | 7/2005 | Schwartz et al. | 382/232 |
| 2007/0206592 | A1 * | 9/2007 | Itakura et al. | 370/389 |
| 2008/0317431 | A1 * | 12/2008 | Mishima et al. | 386/52 |

FOREIGN PATENT DOCUMENTS

| | | |
|---|---|---|
| JP | 2002-112039 A | 4/2002 |
| JP | 2003-274185 A | 9/2003 |
| WO | WO 01/97527 A1 | 12/2001 |
| WO | WO 03/055223 A2 | 7/2003 |

OTHER PUBLICATIONS

Jianhua Wu et al., Embedded Zerotree Runlength Wavelet Image Coding, IEEE Proceedings International Conference on Image Processing, 2001, pp. 784-787.

K. H. Goh et al., Wavelet Transform Based Adaptive Bie-Plan Run-Length Coding for Still Images, Electronic Letters, IEE Stevenage, Mar. 3, 1994, pp. 395-396, vol. 30, No. 5.

Gunnar Karlsson et al., Subband Coding of Video for Packet Networks, Optical Engineering, Soc. of Photo-Optical Instrumentation Engineers, Jul. 1988, pp. 574-586, vol. 27, No. 7.

\* cited by examiner

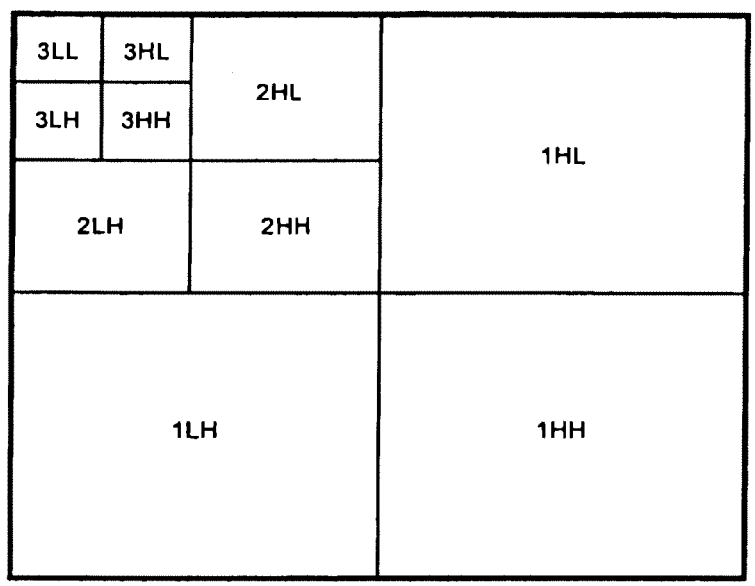
FIG. 16    (PRIOR ART)

ENCODING AND DECODING TWO-DIMENSIONAL SIGNAL USING A WAVELET TRANSFORM

BACKGROUND

The present invention relates to a technology of compression/expansion in a two-dimensional signal, and more particularly to a technology of encoding and decoding the two-dimensional signal employing a wavelet transform.

When the two-dimensional signal that is typified by an image signal is stored in a record medium, or is transmitted via a network, data compression or data encoding is indispensable in order to efficiently utilize a record medium and a transmission path. Conventionally, various techniques such as predictive encoding and encoding employing DCT (Discrete Cosine Transform) have been proposed, and are being used actually. In recent years, the information compressing method employing a wavelet transform has been vigorously studied, and various proposals therefor have been made.

The wavelet transform is, as to speak, subband encoding, in which repeating a subband division of dividing the band in both of a horizontal direction and a vertical direction with respect to a low-frequency band side allows a multi-hierarchy band division to be carried out. Such a band division is called an octave division. When the band is divided as far as a third hierarchy, ten subbands as shown in FIG. 16 can be obtained. Herein, each of 3LL, 3LH, 3HL, and 3HH is a subband of a least significant hierarchy, each of 2LH, 2HL, and 2HH is a subband of a hierarchy higher than it, and each of 1LH, 1HL, and 1HH is a subband of a most significant hierarchy. Further, LH is a subband low-pass-filtered in a horizontal direction and high-pass-filtered in a vertical direction, HL is a subband high-pass-filtered in a horizontal direction and low-pass-filtered in a vertical direction, and HH is a subband high-pass-filtered in both of a horizontal direction and a vertical direction. Each subband includes a wavelet transform coefficient. The wavelet transform coefficient being included in each subband is called a subband coefficient in this Specification. Further, while the wavelet transform, in general, is carried out for each color component such as YCbCr (YUV), the wavelet transform coefficients of all color components that correspond to an identical hierarchy/identical position are called one subband coefficient in a lump in this specification. Further, each color component belonging to an identical subband coefficient is called a component of the subband coefficient.

The wavelet transform, which is characterized in being capable of hierarchically expressing one piece of an image by overlapping image components each having a plurality of resolutions, in having less peculiar distortion and noise that stems from a block structure, for example, a block distortion of a JPEG technique, or the like, is adopted for the technique such as JPEG2000. However, the wavelet transform is used in combination with an entropy coding method that enables each subband coefficient to be efficiently compressed because the wavelet transform itself has no compression effect.

For example, JPEG2000 employs arithmetic encoding as an entropy encoding technique, in which the subband coefficient is decomposed into bit planes, are divided into encoding blocks having a constant size in each subband, and then are subjected to the arithmetic encoding (for example, see Patent document 1).

Further, in Non-patent document 1, a set of coefficients corresponding to an identical space coordinate are extracted from an LH subband, an HL subband, and an HH subband belonging to an identical hierarchy to constitute a vector. Specifically, for example, three coefficients picked up from an identical space position of 3LH, 3HL, and 3HH one by one constitute a three-dimensional vector, and 12 coefficients picked up from 2×2 blocks of an identical space position of 2LH, 2HL, and 2HH four by four constitute a 12-dimensional vector. Next, the vector of which power (magnitude) is in the vicinity of zero is quantized to zero, and is classified as a invalid vector, and all coefficients belonging to the invalid vector are excluded from to-be-encoded coefficients. And, the valid vector is vector-quantized with a codebook corresponding to a class of power of the above vector.

On the other hand, a Huffman code is known as one of the entropy encoding techniques, and an image encoding device as well for encoding each subband coefficient by employing the Huffman code has been proposed (for example, see Patent document 2).

[Patent document 1] JP-P2003-274185A
[Patent document 2] JP-P2002-112039A
[Non-patent document 1] Shuitsu MATSUMURA, Michiaki KATO, Tsuyoshi TAKEBE "Wavelet Image Coding Using Power Adaptive Vector Quantization", 1995 Image Coding Symposium (PCSJ95), October, 1995, pp 121-122

PROBLEMS TO BE SOLVED BY THE INVENTION

JPEG2000 enhances compression efficiency by employing arithmetic encoding for each bit plane of the LH, HL, and HH subband coefficient; however, arithmetic encoding generally causes the problem which imposes a large calculation cost and slows down the processing speed.

Employing the Huffman code for the encoding of the LH, HL, and HH subband coefficients for a purpose of improving this problem causes an encoding efficiency to decline because each coefficient value of LH, HL, and HH is encoded independently. For example, with a typical image, U and V coefficient values of a high-frequency HH subband are mostly zero, and as is often the case, entropically becomes less than one bit on the average. However, the Huffman code demands at least a one-bit code length even if an appearance probability is very high, so the code becomes redundant.

On the other hand, as seen in the Non-patent document 1, the technique of extracting a set of the coefficients, which correspond to an identical space coordinate, from the LH subband, HL subband, and HH subband belonging to an identical hierarchy, constituting a vector, and determining whether the coefficients are valid or invalid vector by vector is suitable for low-bit-rate encoding that premises coarse quantization. However, not only in the case of high-bit-rate encoding, but also in the case that only one part, out of a set of the coefficients corresponding to an identical space coordinate, which has been extracted from the LH subband, HL subband, and HH subband, becomes non-zero in the low-bit-rate encoding as well (in particular, this situation occurs frequently with a graphic image), an excellent compression ratio cannot be obtained because an entirety of the vector, being a set of these coefficients, is determined to be a valid vector, and all coefficients belonging to the above vector are encoded.

An object of the present invention is to provide an encoding/decoding method and device that enable a sufficient compression ratio to be achieved even when a prefix code such as a Huffman code is employed as an entropy encoding technique.

SUMMARY

The encoding device of the present invention includes: a coefficient extracting means for extracting each component of each coefficient one by one, which corresponds to an identical space coordinate, from the LH subband, HL subband, and HH subband belonging to an identical hierarchy in a wavelet subband space, and forming a set of the coefficients; a significant coefficient determining means for determining whether or not each component of each coefficient is significant (non-zero), and combining its determination result for each of the sets of the extracted coefficients, thereby to generating flag information; a flag information encoding means for encoding the generated flag information for each of the sets of extracted coefficients value; and a coefficient encoding means for encoding the significant coefficients for each of the sets of the extracted coefficient values.

A first invention of the present invention is characterized in including: a wavelet transforming means for dividing a two-dimensional signal into subbands each of which is a plurality of frequency domains; a coefficient extracting means for extracting each component of each coefficient, which corresponds to an identical space coordinate, from an LH subband, an HL subband, and an HH subband belonging to an identical hierarchy, and constituting a set of the coefficients; a significant coefficient determining means for, for each of the sets of the coefficients, performing a process of determining whether or not one pre-designated component or more of one pre-designated subband or more is zero, thereby to generate one-bit determination information, respectively, and combining the determination information for each of the sets of the coefficients, thereby to generate flag information having a plural-bit length; a flag information encoding means for subjecting the flag information to variable-length encoding for each of the sets of the coefficients; and a significant coefficient encoding means for, for each of the sets of the coefficients, subjecting the component of which a value is not zero to the variable-length encoding with respect to the components of the coefficients for which the determining process has been performed, and when the components of the coefficients for which the determining process has not been performed exist, subjecting them to the variable-length encoding irrespective of zero/non-zero.

A second invention of the present invention is characterized in that, in the above-mentioned first invention, the second invention includes: a consecutive length determining means for, for each of the sets of the coefficients, determining whether or not all components of all coefficients are zero, and counting the number of times of consecutive appearance of a case that all components of all coefficients are zero as a consecutive length number; and a consecutive length number encoding means, whenever the consecutive length number is settled, subjects the consecutive length number to the variable-length encoding; the flag information encoding means, whenever the consecutive length number is settled, generates and subjects flag information of the set of the coefficients of which the consecutive length has been interrupted to the variable-length encoding; and the significant coefficient encoding means, whenever the consecutive length number is settled, subjects the component of which a value is not zero to the variable-length encoding with respect to the components of the coefficients for which the determining process has been performed, and when the components of the coefficients for which the determining process has not been performed exist, subjects them to the variable-length encoding irrespective of zero/non-zero.

A third invention of the present invention is characterized in that, in the above-mentioned first invention, the third invention includes: a consecutive length determining means for, for each of the sets of the coefficients, counting up the consecutive length number when all components of the coefficients of the LH subband and the HH subband are equal to all components of the coefficients extracted just before in a horizontal direction, and yet all components of the coefficients of the HL subband are equal to all components of the coefficients extracted just before in a vertical direction; and a consecutive length number encoding means, whenever the consecutive length number is settled, subjects the consecutive length number to the variable-length encoding; the flag information encoding means, whenever the consecutive length number is settled, generates and subjects flag information of the set of the coefficients of which the consecutive length has been interrupted to the variable-length encoding; and the significant coefficient encoding means, whenever the consecutive length number is settled, subjects the component of which a value is not zero to the variable-length encoding with respect to the coefficients and the components for which the determining process has been performed, and when the coefficients and the components for which the determining process has not been performed exist, subjects them to the variable-length encoding irrespective of zero/non-zero.

A fourth invention of the present invention is characterized in that, in one of the above-mentioned first to third inventions, the designated subband in the significant coefficient determining means includes the LH subband, the HL subband, and the HH subband.

A fifth invention of the present invention is characterized in that, in one of the above-mentioned first to fourth inventions, the designated component in the significant coefficient determining means includes all components constituting the coefficient.

A sixth invention of the present invention is characterized in that, in one of the above-mentioned first to third inventions, the designated subband and component in the significant coefficient determining means include color difference components of the LH subband, color difference components of the HL subband, and a brightness component and color difference components of the HH subband.

A seventh invention of the present invention is characterized in that, in one of the above-mentioned first to third inventions, the significant coefficient determining means, in the determining process of the designated subband, determines whether or not either of a plurality of the color difference components are zero, thereby, to generate one-bit determination information.

An eighth invention of the present invention is characterized in that, in the above-mentioned seventh invention, the significant coefficient determining means, in the determining process of the LH subband and the HL subband, determines whether or not either of a plurality of the color difference components are zero, thereby to generate one-bit determination information, respectively.

A ninth invention of the present invention is characterized in that, in the above-mentioned second or third invention, the significant coefficient determining means, whenever the consecutive length number is settled by the consecutive length determining means, generates determination information as to whether or nor the settled consecutive length number is zero, generates determination information of the designated subband and the designated component in a consecutive length starting coordinate, and combines these items of the determination information as flag information; and the consecutive length number encoding means, whenever the consecutive length number is settled, subjects the consecutive length number to the variable-length encoding only when the consecutive length number is not zero.

A tenth invention of the present invention is characterized in that, in one of the above-mentioned first to ninth inventions, a base function of the wavelet transforming means is HAAR.

An eleventh invention of the present invention, which is a decoding device into which coefficients of plural subbands obtained with a wavelet transform are inputted as a coding sequence, is characterized in that: the eleventh invention includes a coefficient decoding means for, from the coding sequence of the subband, decoding each component of each coefficient corresponding to an identical space coordinate of an LH subband, an HL subband and a HH subband belonging to an identical hierarchy, and constituting a set of the coefficients; the coefficient decoding means includes: a flag information decoding means for, each of the sets of the coefficients, decoding flag information indicative of the component of the coefficient of which a value becomes zero; and a significant coefficient decoding means for, based upon the flag information, decoding a variable-length code with respect to the component of the coefficient of which a value is not zero; and the flag information includes an aggregation of respective items of one-bit determination information for determining whether or not one pre-designated component or more of one pre-designated subband or more is zero for each of the sets of the coefficients.

A twelfth invention of the present invention is characterized in that, in the above-mentioned eleventh invention: including a consecutive length number decoding means for, whenever the coefficient decoding means performs a decoding process, decoding the consecutive length number, and storing it in a consecutive length number memory; and including a consecutive length means for decreasing a value of the consecutive length number memory and outputting all components of all coefficients as zero without the decoding process performed by the coefficient decoding means when the value of the consecutive length number memory is not zero.

A thirteenth invention of the present invention is characterized in, in the above-mentioned eleventh invention, including a consecutive length number decoding means for, whenever the coefficient decoding means performs a decoding process, decoding the consecutive length number, and storing it in a consecutive length number memory; and including a consecutive length means for decreasing a value of the consecutive length number memory, and outputting values identical to that of each component of the LH subband coefficient and the HH subband coefficient decoded just before in a horizontal direction as values of each component of the LH subband coefficient and the HH subband coefficient and yet outputting values identical to that of each component of the HL subband coefficient decoded just before in a vertical direction as values of each component of the HL subband coefficient without the decoding process performed by the coefficient decoding means when the value of the consecutive length number memory is not zero.

A fourteenth invention of the present invention is characterized in that, in one of the above-mentioned eleventh to thirteenth inventions, the designated subband in the flag information includes the LH subband, the HL subband, and the HH subband.

A fifteenth invention of the present invention is characterized in that, in one of the above-mentioned eleventh to fourteenth inventions, the designated component in the flag information includes all components constituting the coefficient.

A sixteenth invention of the present invention is characterized in that, in one of the above-mentioned eleventh to thirteenth inventions, the designated subband and component in the flag information includes color difference components of the LH subband, color difference components of the HL subband, and a brightness component and color difference components of the HH subband.

A seventeenth invention of the present invention is characterized in that, in one of the above-mentioned eleventh to thirteenth inventions, the flag information includes respective items of one-bit determination information indicating whether or not either of a plurality of color difference components are zero in the designated subband.

An eighteenth invention of the present invention is characterized in that, in the above-mentioned seventeenth invention, the flag information includes respective items of one-bit determination information indicating whether or not either of a plurality of color difference components are zero in the LH subband and the HL subband.

A nineteenth invention of the present invention is characterized in that, in the above-mentioned twelfth or thirteenth invention, the flag information includes one-bit determination information indicating whether or not the consecutive length number is zero; and the consecutive length number decoding means decodes the consecutive length number only when it has been determined from the flag information that the consecutive length number is not zero.

A twentieth invention of the present invention is characterized in that, in one of the above-mentioned eleventh to nineteenth inventions, a base function of the wavelet transforming means is HAAR.

A twenty-first invention of the present invention is characterized in including: a first step of dividing a two-dimensional signal into subbands each of which is a plurality of frequency domains; a second step of extracting each component of each coefficient, which corresponds to an identical space coordinate, from an LH subband, an HL subband, and an HH subband belonging to an identical hierarchy, and constituting a set of the coefficients; a third step of, for each of the sets of the coefficients, performing a process of determining whether or not one pre-designated component or more of one pre-designated subband or more is zero, thereby to generate one-bit determination information, respectively, combining the determination information for each of the sets of the coefficients, thereby to generate flag information having a plural-bit length, and subjecting the above generated flag information to variable-length encoding; and a fourth step of, for each of the sets of the coefficients, subjecting the component of which a value is not zero to the variable-length encoding with respect to the components of the coefficients for which the determining process has been performed, and when the components of the coefficients for which the determining process has not been performed exist, subjecting them to the variable-length encoding irrespective of zero/non-zero.

A twenty-second invention of the present invention is characterized in that in the above-mentioned twenty-first invention: the twenty-second invention includes a fifth step of, for each of the sets of the coefficients, determining whether or not all components of all coefficients are zero, and counting the number of times of consecutive appearance of a case that all components of all coefficients are zero as a consecutive length number; and a sixth step of, whenever the consecutive length number is settled, subjecting the consecutive length number to the variable-length encoding; in the third step, flag information of the set of the coefficients of which the consecutive length has been interrupted is generated and subjected to the variable-length encoding whenever the consecutive length number is settled; and in the fourth step, whenever the consecutive length number is settled, with respect to the components of the coefficients for which the determining process has been performed, the component of which a value is not zero is subjected to the variable-length encoding, and when the components of the coefficients for which the determining process has not been performed exist, they are subjected to the variable-length encoding irrespective of zero/non-zero.

A twenty-third invention of the present invention is characterized in that, in the above-mentioned twenty-first invention: the twenty-third invention includes: a fifth step of, for each of the sets of the coefficients, counting up the consecutive length number when all components of the coefficients of the LH subband and the HH subband are equal to all components of the coefficients extracted just before in a horizontal direction, and yet all components of the coefficients of the HL subband are equal to all components of the coefficients extracted just before in a vertical direction; and a sixth step of, whenever the consecutive length number is settled, subjecting the consecutive length number to the variable-length encoding; in the third step, whenever the consecutive length number is settled, flag information of the set of the coefficients of which the consecutive length has been interrupted is generated and subjected to the variable-length encoding; and in the fourth step, whenever the consecutive length number is settled, with respect to the coefficients and the components for which the determining process has been performed, the component of which a value is not zero is subjected to the variable-length encoding, and when the coefficients and the components for which the determining process has not been performed exist, they are subjected to the variable-length encoding irrespective of zero/non-zero.

A twenty-fourth invention of the present invention is characterized in that: the twenty-fourth invention includes a first step of decoding each component of each coefficient corresponding to an identical space coordinate of an LH subband, an HL subband and a HH subband belonging to an identical hierarchy from coding sequences of plural subbands obtained with a wavelet transform, and constituting a set of the coefficients; the first step includes: a flag information decoding step of, each of the sets of the coefficients, decoding flag information indicative of the component of the coefficient of which a value becomes zero; and a significant coefficient decoding step of, based upon the flag information, decoding a variable-length code with respect to the component of the coefficient of which a value is not zero; and the flag information includes an aggregation of respective items of one-bit determination information for determining whether or not one pre-designated component or more of one pre-designated subband or more is zero for each of the sets of the coefficients.

A twenty-fifth invention of the present invention is characterized in, in the above-mentioned twenty-fourth invention, including; a second step of decoding the consecutive length number and storing it in a consecutive length number memory; and a third step of decreasing a value of the consecutive length number memory and outputting all components of all coefficients as zero instead of the decoding process in the first step when the value of the consecutive length number is not zero.

A twenty-sixth invention of the present invention is characterized in, in the above-mentioned twenty-fourth invention, including: a second step of decoding the consecutive length number and storing it in a consecutive length number memory; and a third step of decreasing a value of the consecutive length number memory, and outputting values identical to that of each component of the LH subband coefficient and the HH subband coefficient decoded just before in a horizontal direction as values of each component of the LH subband coefficient and the HH subband coefficient and yet outputting values identical to that of each component of the HL subband coefficient decoded just before in a vertical direction as values of each component of the HL subband coefficient instead of the decoding process in the first step when the value of the consecutive length number memory is not zero.

A twenty-seventh invention of the present invention is characterized in being a encoding program for causing an information processing device to execute: a first process of dividing a two-dimensional signal into subbands each of which is a plurality of frequency domains; a second process of extracting each component of each coefficient, which corresponds to an identical space coordinate, from an LH subband, an HL subband, and an HH subband belonging to an identical hierarchy, and constituting a set of the coefficients; a third process of, for each of the sets of the coefficients, performing a process of determining whether or not one pre-designated component or more of one pre-designated subband or more is zero, thereby to generate one-bit determination information, respectively, combining the determination information for each of the sets of the coefficients, thereby to generate flag information having a plural-bit length, and subjecting the above generated flag information to variable-length encoding; and a fourth process of, for each of the sets of the coefficients, subjecting the component of which a value is not zero to the variable-length encoding with respect to the components of the coefficients for which the determining process has been performed, and when the components of the coefficients for which the determining process has not been performed exist, subjecting them to the variable-length encoding irrespective of zero/non-zero.

A twenty-eighth invention of the present invention is characterized in that, in the above-mentioned twenty-seventh invention: the twenty-eighth invention causes the information processing device to execute: a fifth process of, for each of the sets of the coefficients, determining whether or not all components of all coefficients are zero, and counting the number of times of consecutive appearance of a case that all components of all coefficients are zero as a consecutive length number; and a sixth process of, whenever the consecutive length number is settled, subjecting the consecutive length number to the variable-length encoding; in the third process, flag information of the set of the coefficients of which the consecutive length has been interrupted is generated and subjected to the variable-length encoding whenever the consecutive length number is settled; and in the fourth process, whenever the consecutive length number is settled, with respect to the components of the coefficients for which the determining process has been performed, the component of which a value is not zero is subjected to the variable-length encoding, and when the components of the coefficients for which the determining process has not been performed exist, they are subjected to the variable-length encoding irrespective of zero/non-zero.

A twenty-ninth invention of the present invention is characterized in that, in the above-mentioned twenty-seventh invention: the twenty-ninth invention causes the information processing device to execute: a fifth process of, for each of the sets of the coefficients, counting up the consecutive length number when all components of the coefficients of the LH subband and the HH subband are equal to all components of the coefficients extracted just before in a horizontal direction, and yet all components of the coefficients of the HL subband are equal to all components of the coefficients extracted just before in a vertical direction; and a sixth process of, whenever the consecutive length number is settled, subjecting the consecutive length number to the variable-length encoding; and in the third process, whenever the consecutive length number is settled, flag information of the set of the coefficients of which the consecutive length has been interrupted is generated and subjected to the variable-length encoding; and in the fourth process, whenever the consecutive length number is settled, with respect to the coefficients and the components for which the determining process has been performed, the component of which a value is not zero is subjected to the variable-length encoding, and when the coefficients and the components for which the determining process has not been performed exist, they are subjected to the variable-length encoding irrespective of zero/non-zero.

A thirtieth invention of the present invention is characterized in that: the thirtieth invention causes an information processing device to execute a first process of decoding each component of each coefficient corresponding to an identical space coordinate of an LH subband, an HL subband and a HH subband belonging to an identical hierarchy from coding sequences of plural subbands obtained with a wavelet transform, and constituting a set of the coefficients; the first process includes: a flag information decoding process of, each of the set of the coefficients, decoding flag information indicative of the component of the coefficient of which a value becomes zero; and a significant coefficient decoding process of, based upon the flag information, decoding a variable-length code with respect to the component of the coefficient of which a value is not zero; and the flag information includes an aggregation of respective items of one-bit determination information for determining whether or not one pre-designated component or more of one pre-designated subband or more is zero for each of the sets of the coefficients.

A thirty-first invention of the present invention is characterized in, in the above-mentioned thirtieth invention, causing the information processing device to execute: a second process of decoding the consecutive length number and storing it in a consecutive length number memory; and a third process of decreasing a value of the consecutive length number memory and outputting all components of all coefficients as zero instead of the decoding process in the first step when the value of the consecutive length number memory is not zero.

A thirty-second invention of the present invention is characterized in being a program for, in the above-mentioned thirtieth invention, causing the information processing device to execute: a second process of decoding the consecutive length number and storing it in a consecutive length number memory; and a third process of decreasing a value of the consecutive length number memory, and outputting values identical to that of each component of the LH subband coefficient and the HH subband coefficient decoded just before in a horizontal direction as values of each component of the LH subband coefficient and the HH subband coefficient and yet outputting values identical to that of each component of the HL subband coefficient decoded just before in a vertical direction as values of each component of the HL subband coefficient instead of the decoding process in the first step when the value of the consecutive length number memory is not zero.

A thirty-third invention of the present invention, which is a record medium that is readable by an information processing device, is characterized in causing the information processing device to execute: a first process of dividing a two-dimensional signal into subbands each of which is a plurality of frequency domains; a second process of extracting each component of each coefficient, which corresponds to an identical space coordinate, from an LH subband, an HL subband, and an HH subband belonging to an identical hierarchy, and constituting a set of the coefficients; a third process of, for each of the sets of the coefficients, performing a process of determining whether or not one pre-designated component or more of one pre-designated subband or more is zero, thereby to generate one-bit determination information, respectively, combining the determination information for each of the sets of the coefficients, thereby to generate flag information having a plural-bit length, and subjecting the above generated flag information to variable-length encoding; and a fourth process of, for each of the sets of the coefficients, subjecting the component of which a value is not zero to the variable-length encoding with respect to the components of the coefficients for which the determining process has been performed, and when the components of the coefficients for which the determining process has not been performed exist, subjecting them to the variable-length encoding irrespective of zero/non-zero.

A thirty-fourth invention of the present invention, which is a record medium that is readable by an information processing device, is characterized in that: the thirty-fourth invention causes the information processing device to execute a first process of decoding each component of each coefficient corresponding to an identical space coordinate of the LH subband, the HL subband and the HH subband belonging to an identical hierarchy from coding sequences of plural subbands obtained with a wavelet transform, and constituting a set of the coefficients; the first process includes: a flag information decoding process of, for each of the sets of the coefficients, decoding flag information indicative of the component of the coefficient of which a value becomes zero; and a significant coefficient decoding process of, based upon the flag information, decoding a variable-length code with respect to the component of the coefficient of which a value is not zero; and the flag information includes an aggregation of respective items of one-bit determination information bit for determining whether or not one pre-designated component or more of one pre-designated subband or more is zero for each of the sets of the coefficients.

In the present invention, out of the coefficients of respective color components in an identical hierarchy/identical space coordinate, a plurality of zero coefficients are multi-dimensionalized and encoded. This enables an average bit number to be reduced because the most frequent zero coefficient is multi-dimensionalized, which enhances a compression ratio. While the codes equivalent to a portion of the flag results in being added at the time of encoding the significant coefficient, an increase in a code quantity accompanied by addition of the flag is relatively small, and as a whole, the compression ratio is enhanced because many images have a deflection (a probability that the U component and the V component of the HH coefficient are zero is high, or the like), and a correlatively (when the coefficient value of the Y component is zero, a probability that the values as well of the U component and the V component are zero is high, or the like) in the coefficients. Owing hereto, the present invention has an effect that an excellent enhancement in the compression ratio can be realized even though the pre-fix code such as a Huffman code is employed as a technique of encoding the coefficient.

BRIEF DESCRIPTION OF THE DRAWINGS

FIG. 16 is an explanatory view of a wavelet transform.

Figure 1:
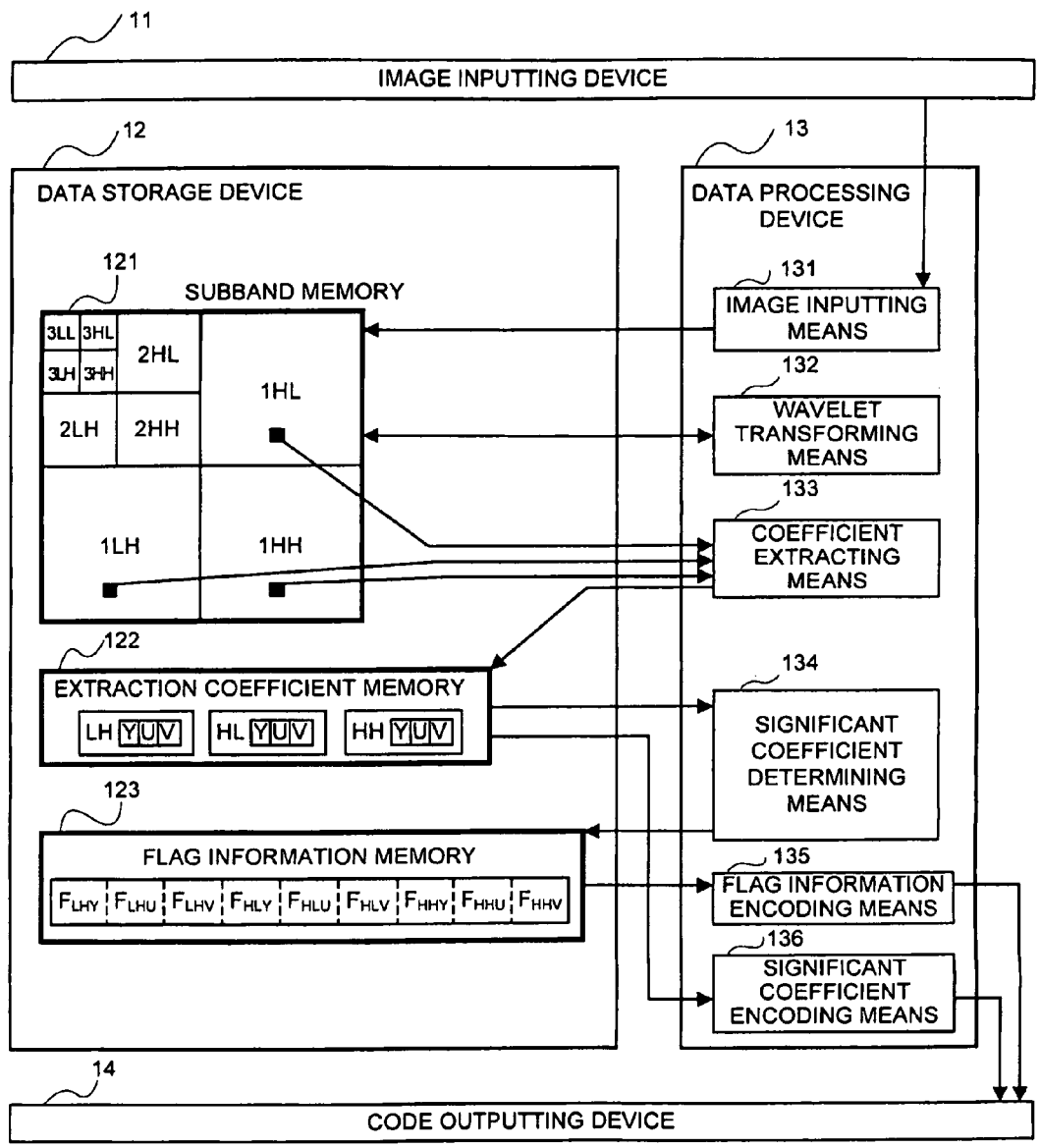
FIG. 1 is a block diagram of a first embodiment of the present invention.

DESCRIPTION OF NUMERALS 11 image inputting device
12 data storage device
121 subband memory
122 extraction coefficient memory
123 flag information memory
13 data processing device
131 image inputting means
132 wavelet transforming means
133 coefficient extracting means
134 significant coefficient determining means
135 flag information encoding means
136 significant coefficient encoding means
14 code outputting device
21 code inputting device
22 data storage device
221 flag information memory
222 coefficient memory
223 subband memory
224 image memory
23 data processing device
231 flag information decoding means
232 significant coefficient decoding means
233 coefficient outputting means
234 inverse-wavelet transforming means
235 image outputting means
24 image outputting device
31 image inputting means
32 data storage device
321 subband memory
322 extraction coefficient memory
323 to-be-encoded coefficient memory
324 previous-line coefficient memory
325 consecutive length number memory
326 flag information memory
33 data processing device
331 image inputting means
332 HAAR wavelet transforming means
333 coefficient extracting means
334 consecutive length determining means
335 significant coefficient determining means
336 flag information encoding means
337 significant coefficient encoding means
338 consecutive length number encoding means
34 code outputting device
41 code inputting device
42 data storage device
421 flag information memory
422 consecutive length number memory
423 previous-line coefficient memory
424 coefficient memory
425 subband memory
426 image memory
43 data processing device
431 flag information decoding means
432 consecutive length number decoding means
433 consecutive length means
434 significant coefficient decoding means
435 HAAR inverse-wavelet transforming means
436 image outputting means
44 image outputting device

DETAILED DESCRIPTION

Next, the best mode for carrying out the present invention will be explained in details by making a reference to accompanied drawings.

Upon making a reference to FIG. 1, the first embodiment of the present invention is configured of an image inputting device 11, a data storage device 12, a data processing device 13 that operates under control of a program control, and a code outputting device 14.

The data storage device 12 includes a subband memory 121, an extraction coefficient memory 122, and a flag information memory 123.

The subband memory 121 stores data of the subbands of plural hierarchies obtained by performing a two-dimensional wavelet transform for an image inputted from the image inputting device 11.

The extraction coefficient memory 122 stores a set of the coefficients of an identical space coordinate of the LH, HL, and HH subbands belonging to an identical hierarchy sequentially extracted from the subband memory 121. The extraction order of the sets of the coefficients is, for example, an order that follows a scan line that goes from a left and upper end to a right and lower end of the image.

The flag information memory 123 stores flag information indicating whether each color component of each coefficient value stored in the extraction coefficient memory 122 is significant (non-zero). With this embodiment, a one-bit flag is assigned for each color component of each coefficient value in order to express whether each color component of each coefficient value is significant independently.

The data processing device 13 includes an image inputting means 131, a wavelet transforming means 132, a coefficient extracting means 133, a significant coefficient determining means 134, a flag information encoding means 135, and a significant coefficient encoding means 136.

Each of these means operates according to the following described roughly.

The image inputting means 131 inputs an image data from the image inputting device 11, and stores it as a 0LL subband in the subband memory 121.

The wavelet transforming means 132 reads out an (n−1)LL subband from the subband memory 121, performs a wavelet transform therefor, thereby to discompose it into an nLL subband, an nLH subband, an nHL subband, and an nHH subband, and output them to the subband memory 121. The wavelet transforming means 132 repeats this operation by a predetermined number of times, to begin with n=1, thereby to constitute the octave-divided subbands of each hierarchy within the subband memory 121.

The coefficient extracting means 133 extracts the coefficient value that corresponds to an identical hierarchy and yet a spatially identical position from the LH, HL, and HH subbands, and stores them in the extraction coefficient memory 122. At this moment, the coefficient extracting means 133 extracts the coefficient values of all color components, which corresponds to an identical hierarchy and yet a spatially identical position, with respect to the image having a plurality of the color components such as YCbCr (YUV).

The significant coefficient determining means 134 determines whether each color component of each coefficient value stored in the extraction coefficient memory 122 is significant (non-zero), and defines a determination result as one-bit flag information, respectively. In addition hereto, the significant coefficient determining means 134 combines items of the flag information associated with all color components of all of these coefficients, and stores it as plural-bit flag information in the flag information memory 123.

The flag information encoding means 135 subjects the value of the flag information memory 123 to the variable-length encoding, and outputs it to the code outputting device 14.

The significant coefficient encoding means 136 subjects only the significant coefficient to the variable-length encoding out of the coefficients of the extraction coefficient memory 122, and outputs it to the code outputting device 14.

An operation of an entirety of this embodiment will be explained in details by making a reference to flowcharts of FIG. 1 and FIG. 2.

Figure 2:
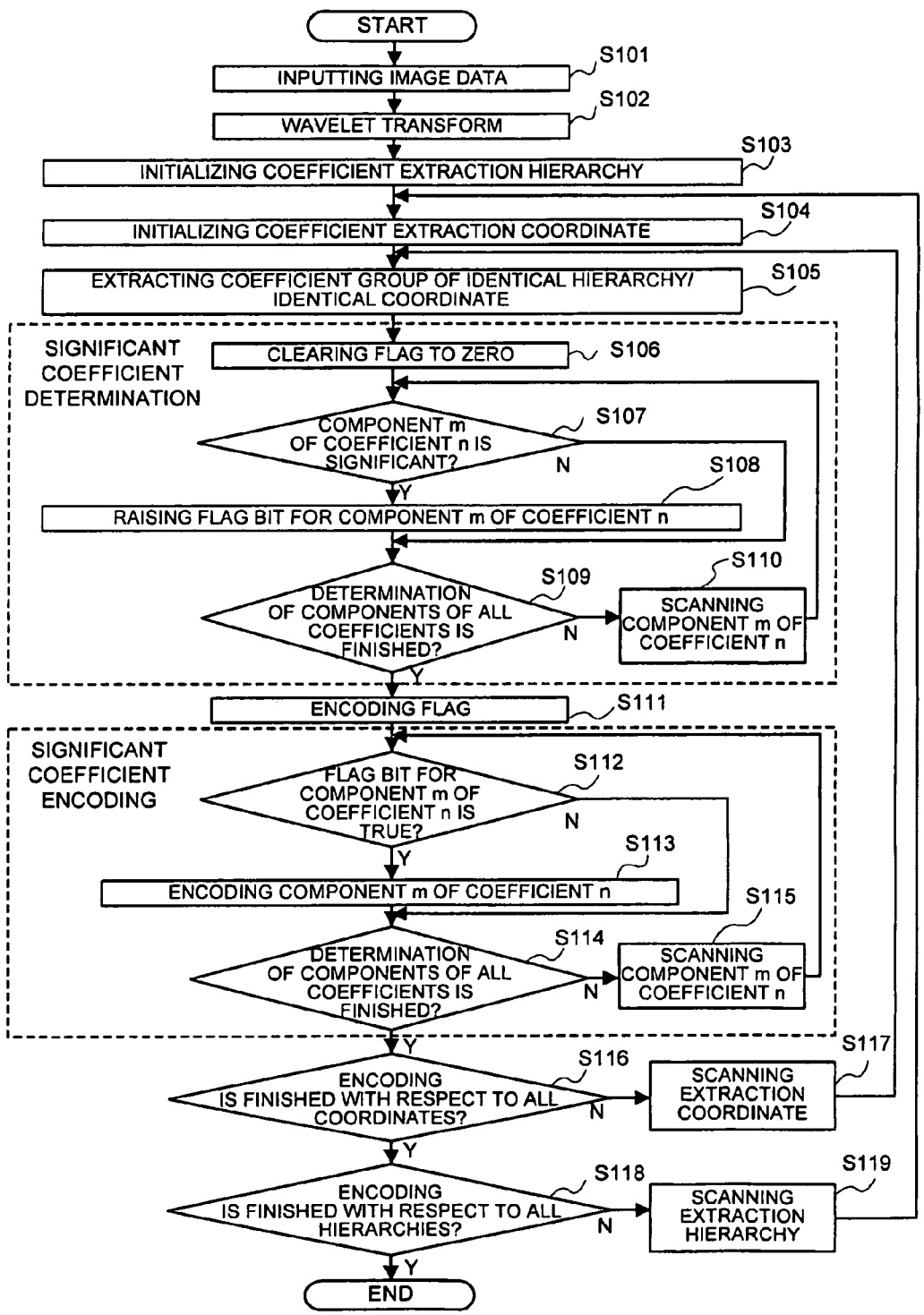
FIG. 2 is a flowchart illustrating an operation of the first embodiment of the present invention.

At first, the image inputting means 131 inputs the image data from the image inputting device 11, and accumulates it as a 0LL subband in the subband memory 121 (step S101 of FIG. 2).

Next, the wavelet transforming means 132 reads out an (n−1)LL subband from the subband memory 121, performs a wavelet transform therefor, thereby to discompose it into an nLL subband, an nLH subband, an nHL subband, and an nHH subband, and output them to the subband memory 121. The wavelet transforming means 132 repeats this operation by a predetermined number of times, to begin with n=1, thereby to constitute the octave-divided subbands of each hierarchy within the subband memory 121 (step S102).

Next, a coefficient extraction hierarchy is initialized to a lowest frequency (in FIG. 1, 3LH, 3HL, and 3HH) (step S103).

Next, a coefficient extraction coordinate is initialized to an origin (0,0) (step S104).

Next, the coefficient extracting means 133 extracts the coefficient values that correspond to a spatially identical position from the LH, HL, and HH subbands of an identical hierarchy, and stores them in the extraction coefficient memory 122 (step S105). At this moment, the coefficient extracting means 133 extracts the coefficient values of all color components with respect to the image having a plurality of the color components such as YCbCr (YUV).

The significant coefficient determining means 134 determines whether each color component of each coefficient value stored in the extraction coefficient memory 122 is significant (non-zero), and defines a determination result as one-bit flag information, respectively. In addition hereto, the significant coefficient determining means 134 combines items of the flag information associated with all color components of all of these coefficients, and stores it as plural-bit flag information in the flag information memory 123 (step S106 to step S110).

In the operation of the significant coefficient determination (step S106 to step S109), at first, the significant coefficient determining means 134 clears the flag information memory 123 to zero (step S106).

Continuously, the significant coefficient determining means 134 determines whether a component m of a coefficient n is significant (step S107), and raises a flag bit for the component m of the coefficient n when it is significant (step S108). The significant coefficient determining means 134 repeats these processes (step S107 and step S108) by changing n and m (step S110) until a determination of all components of all coefficients is completed (step S109).

Next, the flag information encoding means 135 subjects the value of the flag information memory 123 to the variable-length encoding, and outputs it to the code outputting device 14 (step S111).

Next, the significant coefficient encoding means 136 subjects only the significant coefficient to the variable-length encoding out of the coefficients of the extraction coefficient memory 122, and outputs it to the code outputting device 14 (step S112 to step S115).

Specifically, at first, the significant coefficient encoding means 136 determines whether the flag bit for the component m of the coefficient n has been raised (step S112), encodes the value of for the component m of the coefficient n when it has been raised, and outputs it to the code outputting device 14 (step S113). The significant coefficient encoding means 136 repeats these processes (step S112 and step S113) by changing n and m (step S115) until a determination of all components of all coefficients is completed (step S114).

Continuously, the significant coefficient encoding means 136 determines whether the above process has been completed with respect to all coordinates of an identical hierarchy (step S116), scans the next coordinate as a coefficient extraction coordinate (step S117) when it has not been completed, and returns to the step S105.

When the process has been completed with respect to all coordinates of an identical hierarchy, the significant coefficient encoding means 136 determines whether the process has been completed with respect all hierarchies (step S118), and scans the next hierarchy as a coefficient extraction hierarchy when it has not been completed (step S119), and returns to the step S104.

Next, an effect of this embodiment will be explained.

In this embodiment, out of the coefficients of respective color components in an identical hierarchy and an identical space coordinate, a plurality of zero coefficients are multi-dimensionalized and encoded. This enables an average bit number to be reduced because the most frequent zero coefficient is multi-dimensionalized, and enables the high compression ratio to be accomplished even though the simple pre-fix code such as a Huffman code is employed.

While the code equivalent to a portion of the flag results in being added at the time of encoding the significant coefficient, an increase in a code quantity accompanied by addition of the flag is relatively small, and as a whole, the compression ratio is enhanced because many images have are a deflection (a probability that, in particular, the U component and the V component of the HH coefficient are zero is high, or the like), and a correlativity (when the coefficient value of the Y component is zero, a probability that the coefficient values as well of the U component and the V component are zero is high, or the like) in nine coefficients.

Additionally, while description of the encoding of the subband was omitted in this embodiment, the conventional technique such as LZW can be utilized therefor. Even though the conventional technique is applied for this embodiment, an effect owing to the present invention still large because a ratio of a processing quantity and a code quantity of the LL subband over the entirety is small.

Further, this embodiment was explained by exemplifying YCbCr (YUV) as a expressive color representation, and also when other expressive color representations such as RGB, L*a*b*, CMYK, etc. are employed, this embodiment can be applied similarly.

Further, the flag information encoding means 135 in accordance with this embodiment used a one-pass encoding scheme in which the code was outputted whenever the flag information and the coefficient value were obtained, and instead of this scheme, may use a two-pass scheme in which the frequency is counted to generate a static Huffman code in a first pass, and the code is outputted in a second pass.

Further, while the Y component, the U component, and the V component of LH, HL, and HH were all multi-dimensionalized in this embodiment, some components such as the Y component of LH and the Y component of HL each having a relative low probability that the zero appears may be individually encoded by all means without the significant coefficient determining process performed. This enables a bit width of the flag information memory to be reduced to eight bits or less, which improves use efficiency of a memory and a bus.

Further, performing a quantizing process such that the coefficient value close to zero is forcibly reduced to zero after the wavelet transform allows the compression ratio to be improved all the more.

Next, the second embodiment of the present invention will be explained in details by making a reference to accompanied drawings.

Figure 3:
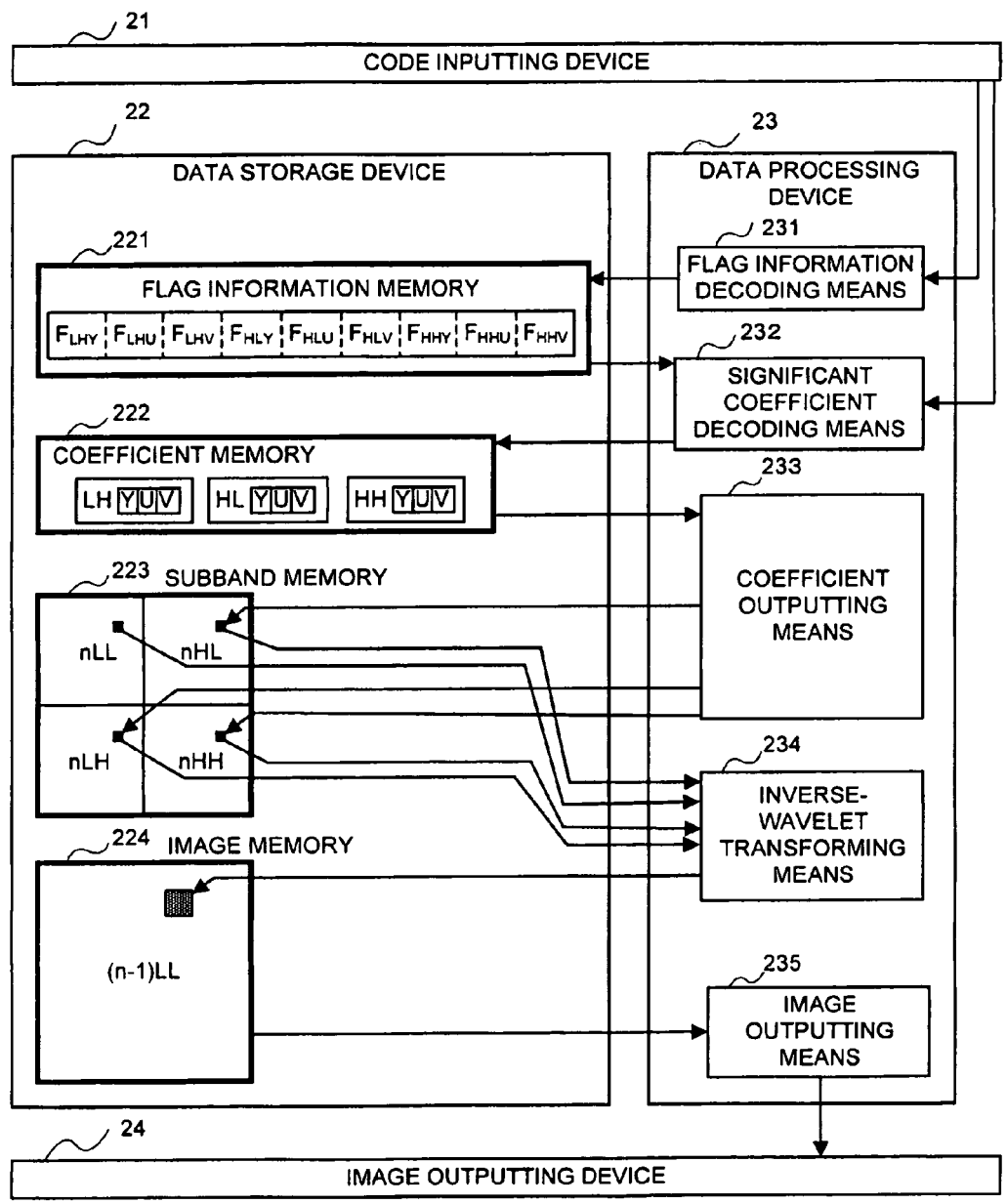
FIG. 3 is a block diagram of a second embodiment of the present invention.

Upon making a reference to FIG. 3, the second embodiment of the present invention is configured of a code inputting device 21, a data storage device 22, a data processing device 23 that operates under control of a program control, and an image outputting device 24.

The data storage device 22 includes a flag information memory 221, a coefficient memory 222, a subband memory 223, and an image memory 224.

The flag information memory 221 stores flag information decoded by the data processing device 23.

The coefficient memory 222 stores a set of the coefficients of the LH, HL, and HH subbands of an identical space coordinate decoded by the data processing device 23.

The subband memory 223 stores the subbands decoded by the data processing device 23. Additionally, it is assumed that a direct-current component of the image is pre-stored in the LL subband within the subband memory 223.

The image memory 224 stores the image data decoded by the data processing device 23.

The data processing device 23 includes a flag information decoding means 231, a significant coefficient decoding means 232, a coefficient outputting means 233, an inverse-wavelet transforming means 234, and an image outputting means 235.

Each of these means operates according to the following described roughly.

The flag information decoding means 231 acquires and decodes the variable-length code data associated with the flag information from the code inputting device 21, and stores a decoding result in the flag information memory 221.

The significant coefficient decoding means 232 reads out the flag information from the flag information memory 221.

In addition hereto, it determines whether each component (Y, U, and V) of the coefficients (LH, HL, and HH) of an identical space coordinate in an identical hierarchy is significant, responding to truth or falsehood of each bit value of the flag information. The significant coefficient decoding means 232 acquires and decodes the variable-length code data with respect to the coefficient/component of which the determination result is significant from the code inputting device 21, and stores it in the coefficient memory 222. With the coefficient/component of which the determination result is non-significant, the significant coefficient decoding means 232 stores a zero value in the coefficient memory 222.

As a result, the coefficient value of each component of an identical space coordinate in an identical hierarchy is decoded to the coefficient memory 222.

The coefficient outputting means 233 reads out the coefficient value stored in the coefficient memory 222, and outputs it to the subband memory 223.

The inverse-wavelet transforming means 234 reads out the coefficient values of the LL, the LH, the HL, the HH subbands from the subband memory 223, performs an inverse-wavelet transform therefor, and outputs a result to the image memory 224.

The image outputting means 235 reads out the image data from the image memory 224, and outputs it to the image outputting device 24.

Figure 4:
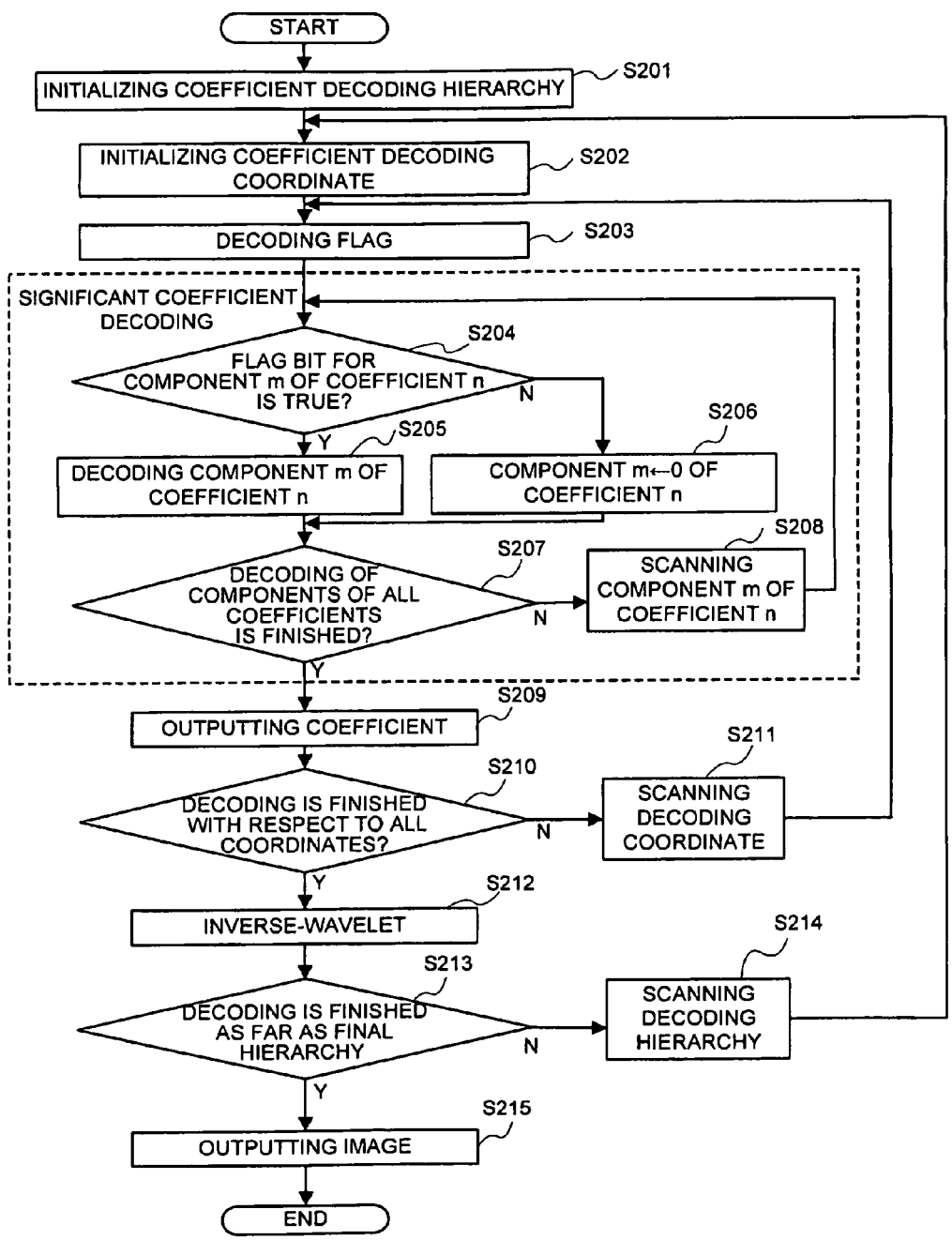
FIG. 4 is a flowchart illustrating an operation of the second embodiment of the present invention.

Next, an operation of an entirety of this embodiment will be explained in details by making a reference to flowcharts of FIG. 3 and FIG. 4.

At first, the coefficient decoding hierarchy is initialized to a lowest frequency (step S201).

Next, the coefficient decoding coordinate is initialized to an origin (0,0) (step S202).

The flag information decoding means 231 acquires and decodes the variable-length code data from the code inputting device 21, and stores a decoding result in the flag information memory 221 (step S203).

The significant coefficient decoding means 232 reads out the flag information from the flag information memory 221.

The significant coefficient decoding means 232 determines whether each component (Y, U, and V) of the coefficients (LH, HL, and HH) of an identical space coordinate in an identical hierarchy is significant, responding to truth or falsehood of each bit value of the flag information (step S204).

The significant coefficient decoding means 232 acquires and decodes the variable-length code data with respect to the component of the coefficient of which the determination result is significant from the code inputting device 21, and stores it in the coefficient memory 222 (step S205). With the component of the coefficient of which the determination result is non-significant, the significant coefficient decoding means 232 stores a zero value in the coefficient memory 222 (step S206).

Above, it is determined whether the process of the step S204 to the step S206 has been completed with respect to the components of all coefficients (step S207), and when it has not been completed, the component of the coefficient for which the process has not been completed is scanned (step S208), and the operation returns to the step S204.

The coefficient outputting means 233 reads out the coefficient value stored in the coefficient memory 222, and outputs it to the subband memory 223 (step S209).

Above, it is determined whether the process of the step S203 to the step S209 has been completed with respect to all coordinates (step S210), and when it has not been completed, the decoding coordinates for which the process has not been completed are scanned (step S211), and the operation returns to the step S203.

When the decoding of the coefficient values of all coordinates has been completed, the inverse-wavelet transforming means 234 reads out the coefficient values of the LL, the LH, the HL, and the HH subbands from the subband memory 223, performs an inverse-wavelet transform therefor, and outputs a result to the image memory 224 (step S212).

Above, it is determined whether the process of the step S202 to the step S212 has been completed with respect to all hierarchies (step S213), and when it has not been completed, the next hierarchy is scanned (step S214) after the image memory 224 is stored in LL of the subband memory 223, and the operation returns to the step S202.

When the process is completed with respect to all hierarchies, the image outputting means 235 reads out the image data from the image memory 224, and outputs it to the image outputting device 24 (step S215).

Next, an effect of this embodiment will be explained.

This embodiment, which corresponds to the decoding device of the data encoded in the first embodiment, has an advantage that the simplified decoding using the prefix code is enabled, and simultaneously therewith an enhancement in the compression ratio is enabled.

Next, the third embodiment of the present invention will be explained in details by making a reference to accompanied drawings.

Figure 5:
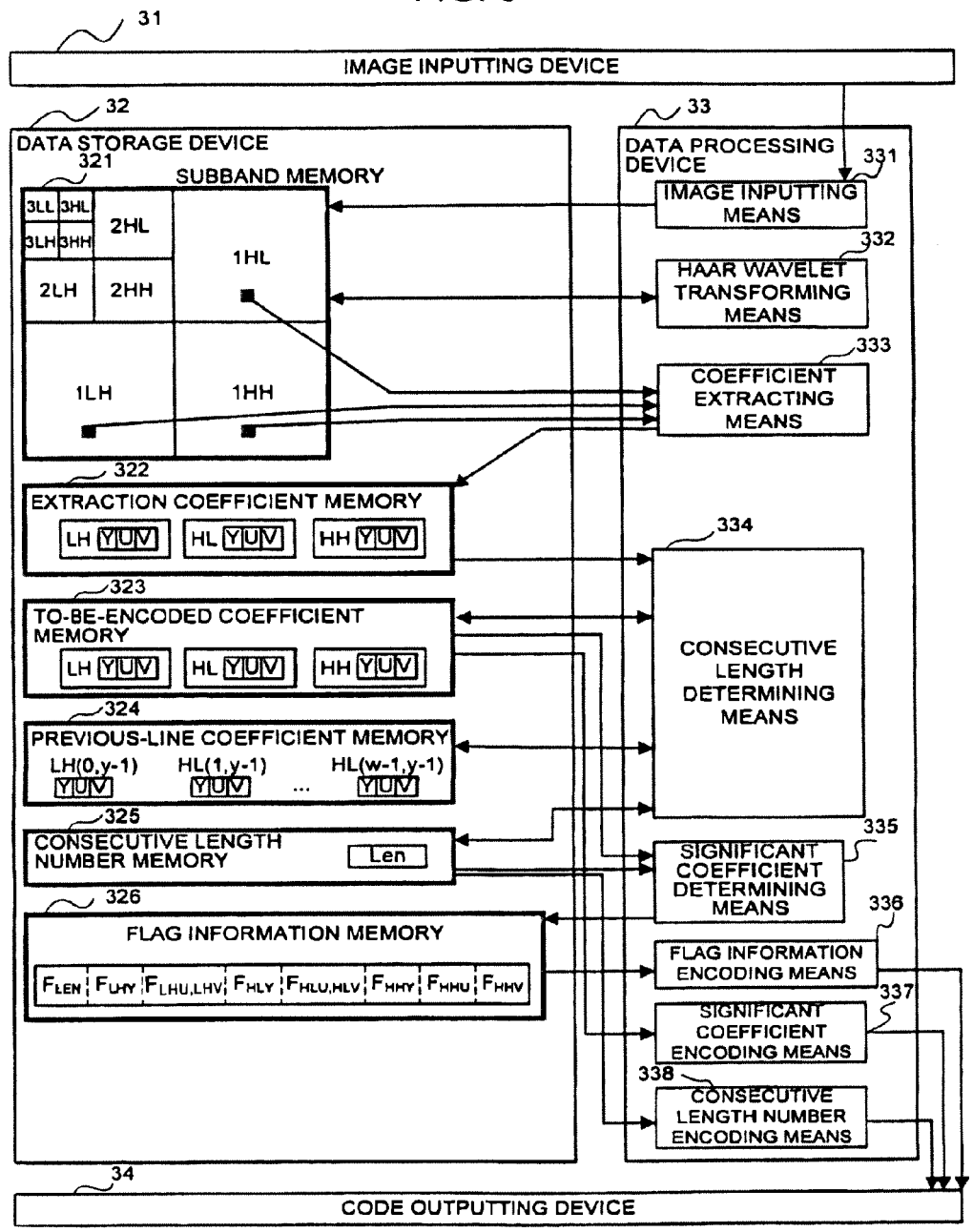
FIG. 5 is a block diagram of a third embodiment of the present invention.

Upon making a reference to FIG. 5, the third embodiment of the present invention is configured of an image inputting device 31, a data storage device 32, a data processing device 33 that operates under control of a program control, and a code outputting device 34.

The data storage device 32 includes a subband memory 321, an extraction coefficient memory 322, a to-be-encoded coefficient memory 323, a previous-line coefficient memory 324, a consecutive length number memory 325, and a flag information memory 326. The subband memory 321 and the extraction coefficient memory 322 are identical to the subband memory 121 and the extraction coefficient memory 122 of FIG. 1 in the first embodiment, respectively.

The to-be-encoded coefficient memory 323 has a capacity capable of holding one or more of each coefficient value of each of LH, HL, and HH, and, for example, only the zero value is stored as an initial value in it at the time of encoding with respect to each hierarchy. Further, whenever the consecutive length number (the number of times of the consecutive appearance of the zero) is settled, the content of the extraction coefficient memory 322 is copied. With this embodiment, each coefficient value stored in the to-be-encoded coefficient memory 323 becomes a target of encoding.

The previous-line coefficient memory 324 has a capacity capable of holding a one-line portion of the HL subband of a hierarchy that becomes a target of encoding, and for example, only the zero value is stored as an initial value in it at the time of encoding with respect to each hierarchy. Further, the coefficient value of HL of the extraction coefficient memory 322 is appropriately copied.

In the consecutive length number memory 325, the zero value is stored as an initial value at the time of encoding with respect to each hierarchy. Further, the consecutive length number memory 325 is counted up when all components of the coefficients of the LH and the HH subbands are equal to all components of the coefficients extracted just before in a horizontal direction, and yet all components of the coefficients of the HL are equal to all components of the coefficients extracted just before in a vertical direction.

The flag information memory 326 stores the flag information indicating whether each color component of each coefficient value stored in the to-be-encoded coefficient memory 323 is significant (non-zero), and indicating whether the consecutive length number of the consecutive length number memory 325 is a significant (non-zero) data. With this embodiment, assigning an identical one-bit flag to the component counterparts that have a correlativity in frequency of the zero value with each other, out of the color components of the coefficient values, allows the bit number of the flag information to be reduced. In this embodiment, the U component and the V component of the LH and the HL coefficients share a flag. With this embodiment, the bit number of the flag information is eight.

The data processing device 33 includes an image inputting means 331, an HAAR wavelet transforming means 332, a coefficient extracting means 333, a consecutive length determining means 334, a significant coefficient determining means 335, a flag information encoding means 336, a significant coefficient encoding means 337, and a consecutive length number encoding means 338.

Each of these means operates according to the following described roughly.

The image inputting means 331 inputs the image data from the image inputting device 31, and accumulates it as a 0LL subband in the subband memory 321.

The HAAR wavelet transforming means 332 is a wavelet transforming means having HAAR as a base function. The HAAR wavelet transforming means 332 reads out an (n−1) LL subband from the subband memory 321, performs an HAAR wavelet transform therefor, thereby to discompose it into an nLL subband, an nLH subband, an nHL subband, and an nHH subband, and output them to the subband memory 321. The HAAR wavelet transforming means 332 repeats this operation by a predetermined number of times, to begin with n=1, thereby to constitute the octave-divided subbands of each hierarchy within the subband memory 321.

The coefficient extracting means 333 extracts the coefficient values that correspond to an identical hierarchy and yet a spatially identical position from the LH, HL, and HH subbands, and stores them in the extraction coefficient memory 322. At this moment, with respect to the image having a plurality of the color components such as YCbCr (YUV), the coefficient extracting means 333 extracts the coefficient values of all color components that corresponds to an identical hierarchy and yet a spatially identical position.

The consecutive length determining means 334 compares the LH coefficient value within the extraction coefficient memory 322 with the LH coefficient value within the to-be-encoded coefficient memory 323, the HH coefficient value within the extraction coefficient memory 322 with the HH coefficient value within the to-be-encoded coefficient memory 323, and the HL coefficient value within the extraction coefficient memory 322 with the HL coefficient value of an identical X coordinate that is included in the previous-line coefficient memory 324, respectively. When these compared coefficient values all coincide with each other, and yet the consecutive length number within the consecutive length number memory 325 is less than a pre-set maximum value, the consecutive length determining means 334 increments the consecutive length number of the consecutive length number memory 325. When the HL coefficients differ from each other, the consecutive length determining means 334 transcribes the HL coefficient value within the extraction coefficient memory 322 to the HL coefficient of an identical X coordinate in the previous-line coefficient memory 324.

The significant coefficient determining means 335 determines whether each color component of each coefficient value stored in the to-be-encoded coefficient memory 323 is significant (non-zero). It defines a determination result of each of the Y component of the LH, HL, and HH coefficients, and the U component and the V component of the HH coefficient as one-bit flag information. It raises a one-bit flag for each of the U component and the V component of each of the LH coefficient and the HL coefficient when at least one component, out of the U component and the V component, is significant. Further, it determines whether the consecutive length number of the consecutive length number memory 325 is significant (non-zero), and defines a determination result as one-bit flag information similarly. In addition hereto, the significant coefficient determining means 335 combines all of these items of the flag information, and stores it as plural-bit flag information in the flag information memory 326.

The flag information encoding means 336 subjects the value of the flag information memory 326 to the variable-length encoding, and outputs it to the code outputting device 34.

The significant coefficient encoding means 337 subjects only the significant coefficient to the variable-length encoding out of the coefficients of the to-be-encoded coefficient memory 323, and outputs it to the code outputting device 34. Further, after outputting the code, the significant coefficient encoding means 337 copies the coefficient value of the extraction coefficient memory 322 to the to-be-encoded coefficient memory 323.

The consecutive length number encoding means 338, when the consecutive length number that is included in the consecutive length number memory 325 is non-zero, subjects the consecutive length number to the variable-length encoding, and outputs it to the code outputting device 34. Further, after outputting the code, it initializes the consecutive length number of the consecutive length number memory 325 to zero.

Next, an operation of an entirety of this embodiment will be explained in details by making a reference to flowcharts of FIG. 5 and FIG. 6.

Figure 6:
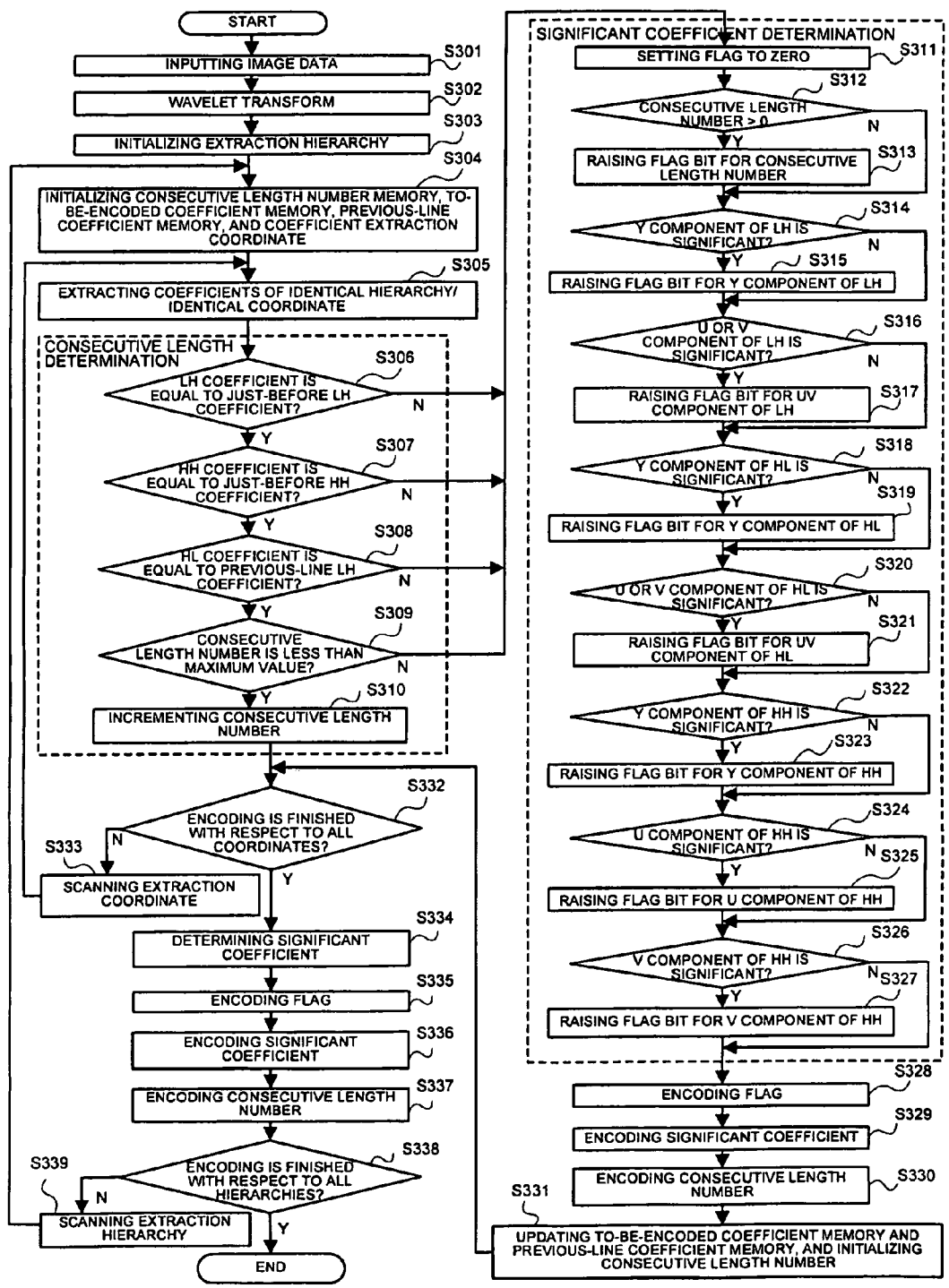
FIG. 6 is a flowchart illustrating an operation of the third embodiment of the present invention.

At first, the image inputting means 331 inputs the image data from the image inputting device 31, and accumulates it as a 0LL subband in subband memory 321 (step S301 of FIG. 6).

Next, the HAAR wavelet transforming means 332 reads out an (n−1)LL subband from the subband memory 321, performs a wavelet transform therefor, thereby to discompose it into an nLL subband, an nLH subband, an nHL subband, and an nHH subband, and output them to the subband memory 321. The HAAR wavelet transforming means 332 repeats this operation by a predetermined number of times, to begin with n=1, thereby to constitute the octave-divided subbands of each hierarchy within the subband memory 321 (step S302).

Next, the coefficient extraction hierarchy is initialized to a lowest frequency (in FIG. 5, 3LH, 3HL, and 3HH) (step S303).

Next, the consecutive length number memory 325, the to-be-encoded coefficient memory 323, and the previous-line coefficient memory 324 are initialized to a zero value. Further, the coefficient extraction coordinate is initialized to an origin (0,0) (step S304).

Next, the coefficient extracting means 333 extracts the coefficient values that correspond to a spatially identical position from the LH, the HL, and the HH subbands of an identical hierarchy, and stores them in the extraction coefficient memory 322 (step S305). At this moment, with respect to the image having a plurality of the color components such as YCbCr (YUV), the coefficient extracting means 333 extracts the coefficient values of all color components.

Next, the consecutive length determining means 334 compares the LH coefficient value within the extraction coefficient memory 322 with the LH coefficient value within the to-be-encoded coefficient memory 323, and when they are identical to each other, it proceeds to a step S307. When they differ, it proceeds to a step S311 (step S306).

Next, the consecutive length determining means 334 compares the HH coefficient value within the extraction coefficient memory 322 with the HH coefficient value within the to-be-encoded coefficient memory 323, and when they are identical to each other, it proceeds to a step S308. When they differ, it proceeds to the step S311 (step S307).

Next, the consecutive length determining means 334 compares the HL coefficient value within the extraction coefficient memory 322 with the HL coefficient value of an identical X coordinate within the previous-line coefficient memory 324, and when they are identical to each other, it proceeds to a step S309. When they differ, it proceeds to the step S311 (step S308).

Next, when the consecutive length number stored in the consecutive length number memory 325 is less than a pre-set maximum value, the consecutive length determining means 334 proceeds to a step S310. When it is a maximum value or more, the consecutive length determining means 334 proceeds to the step S311 (step S310).

When all conditions described above are satisfied, the consecutive length determining means 334 increments the consecutive length number within the consecutive length number memory 325, and proceeds to a step S332 (step S310).

When any of these conditions described above is not satisfied, the significant coefficient determining means 335 performs the significant coefficient determining process (step S311 to step S327).

In the significant coefficient determining process, at first, the significant coefficient determining means 335 zero-clears the flag value within the flag information memory 326 (step S311).

Next, the significant coefficient determining means 335 investigates whether the consecutive length number within the consecutive length number memory 325 is non-zero (step S312), and when it is non-zero, raises a bit for the consecutive length number, out of the flag bits within the flag information memory 326 (step S313).

Next, the significant coefficient determining means 335 investigates whether the Y component of the LH coefficient within the to-be-encoded coefficient memory 323 is non-zero (step S314), and when it is non-zero, raises a bit for the Y component of the LH coefficient, out of the flag bits within the flag information memory 326 (step S315)

Next, the significant coefficient determining means 335 investigates whether the U or V component of the LH coefficient within the to-be-encoded coefficient memory 323 is non-zero (step S316), and when at least one component is non-zero, raises a bit for the UV component of the LH coefficient, out of the flag bits within the flag information memory 326 (step S317).

Likewise, the significant coefficient determining means 335 investigates whether the Y component of the HL coefficient within the to-be-encoded coefficient memory 323 is non-zero (step S318), and when it is non-zero, raises a bit for the Y component of the HL coefficient, out of the flag bits within the flag information memory 326 (step S319). Further, it investigates whether the U or V component of the HL coefficient within the to-be-encoded coefficient memory 323 is non-zero (step S320), and when at least one component is non-zero, raises a bit for the UV component of the HL coefficient, out of the flag bits within the flag information memory 326 (step S321).

Next, the significant coefficient determining means 335 investigates whether the Y component of the HH coefficient within the to-be-encoded coefficient memory 323 is non-zero (step S322), and when it is non-zero, raises a bit for the Y component of the HH coefficient, out of the flag bits within the flag information memory 326 (step S323). Likewise, the significant coefficient determining means 335 investigates whether the U component of the HH coefficient within the to-be-encoded coefficient memory 323 is non-zero (step S324), and when it is non-zero, raises a bit for the U component of the HH coefficient, out of the flag bits within the flag information memory 326 (step S325). Further, the significant coefficient determining means 335 investigates whether the V component of the HH coefficient within the to-be-encoded coefficient memory 323 is non-zero (step S326), and when it is non-zero, raises a bit for the V component of the HH coefficient, out of the flag bits within the flag information memory 326 (step S327).

When the significant coefficient determining process mentioned above is finished, the flag information encoding means 336 subjects the flag of the flag information memory 326 to the variable-length encoding (step S328), and outputs it to the code outputting device 34.

Next, the significant coefficient encoding means 337 encodes the significant coefficient with a method similar to the significant coefficient encoding process in the first embodiment shown in the step S112 to the step S114 of FIG. 2 (step S329). Specifically, the significant coefficient encoding means 337 subjects the components for which the flag bit of the flag information memory 326 has been raised to the variable-length encoding, out of the Y, U, V components of the LH, HL, HH coefficients, in a predetermined order. Herein, it is assumed that the determination and the encoding are carried out in an order of LH-Y→LH-U→LH-V→HL-Y→HL-U→HL-V→HH-Y→HH-U→HH-V. At this time, when at least one component, out of the U component and the V component of LH and HL, is significant, the significant coefficient encoding means 337 subjects both of U and V to the variable-length encoding, and outputs them.

Next, when the consecutive length number that is included in the consecutive length number memory 325 is non-zero, the consecutive length number encoding means 338 subjects the consecutive length number to the variable-length encoding, and outputs it to the code outputting device 34 (step S330).

After outputting the code, the significant coefficient encoding means 337 and the consecutive length number encoding means 338 copy the coefficient value of the extraction coefficient memory 322 to the to-be-encoded coefficient memory 323, and initializes the consecutive length number. Further, they transcribe the HL coefficient value within extraction coefficient memory 322 to the HL coefficient of an identical X coordinate of the previous-line coefficient memory 324 (step S331).

Above, it is determined whether the process of the step S305 to the step S331 has been completed with respect to all coordinates (step S332), and when it has not been completed, the decoding coordinates for which the process has not been completed are scanned (step S333), and the operation returns to the step S305.

When the process has been completed with respect to all coordinates, the significant coefficient encoding means 337 performs a significant coefficient determining process similar to the step S311 to the step S327 (step S334) as a termination process, the flag information encoding means 336 encodes and outputs the flag of the flag information memory 326 (step S335), the significant coefficient encoding means 337 encodes and outputs the significant coefficient (step S336), and the consecutive length number encoding means 338 encodes and outputs the consecutive length number (step S337).

Above, it is determined whether the process of the step S304 to the step S337 has been completed with respect to all hierarchies (step S338), and when it has not been completed, the next hierarchy is scanned as a coefficient extraction hierarchy (step S339) and the operation returns to the step S304.

Next, an effect of this embodiment will be explained.

In addition to an effect of the first embodiment, this embodiment makes it possible to enhance use efficiency of the memory and the bus because the flag information has an eight-bit sequence. In this embodiment, the U component and the V component of each of LH and HL are integrated to have a one-bit flag so that the flag information can be accommodated into an eight-bit sequence. The integration hardly causes the compression ratio to decline because, as a rule, there is a strong correlativity in significativity between these coefficients (for example, when the U component of LH is significant, a probability that the V component as well is significant is high, and when the U component is zero, a probability that the V component as well is zero is high)

Likewise, the flags of the U component and the V component of the HH coefficient may be integrated. However, the multi-dimensionalization greatly contributes to the compression ratio because, originally, each of the U component and the V component of the HH coefficient has a zero value in many cases. For this reason, it is more advantageous from a viewpoint of the compression ratio to individually determine significativity.

Further, this embodiment has an effect as well that the compression ratio is enhanced owing to the consecutive length.

As a rule, the LH subband has a tendency that the identical value continues in a horizontal direction, and the HL subband has a tendency that the identical value continues in a vertical direction. In particular, the above tendency is conspicuous when the HAAR wavelet transform is applied for graphic images such as a character and a pattern.

Further, the HH subband as well has a tendency that the identical value continues in a horizontal direction. The above tendency is conspicuous when the HAAR wavelet transform is applied for graphic images.

It is clear from this fact that compressing the consecutive length, being the number of the times of the consecutive appearance of these coefficients, in combination with the HAAR wavelet transform makes it possible to greatly enhance the compression ratio of the graphic image. Further, the almost excellent compression ratio can be obtained even though this consecutive length determining technique is applied for not the graphic image but the natural image.

Further, the above-mentioned consecutive length determining technique, with respect to the HL coefficient, does not count the consecutive length in a vertical direction thereof, but analyzes a coincidence length by making a comparison with the HL coefficient value of the one-previous line. Such a sliding dictionary enables consecutiveness of a memory access to be enhanced and a high-speed operation to be attained all the more as compared with the counting of the vertical consecutive length.

Further, not counting/encoding the consecutive length values individually for each of the Y, U, and V component of each of the LH, HL, and HH coefficients, but handling them in a lump allows simplification of the process and an enhancement in the compression ratio to be accomplished. It is thinkable that the reason is that many images have a correlativity between each of the components and the other with respect to a position in which the consecutive length is disconnected (for example, when the consecutive length of the Y component of LH is intersected, a probability that the consecutive length of the components as well other than it is intersected is high). For this, even though the consecutive length number is not recorded individually, but is counted and encoded in a lump, the compression ratio hardly lowers. Further, in a situation where the consecutive length of the values being all zero continues, even though only either component having the non-zero value appears, and resultantly the consecutive length is disconnected, a decline in the compression ratio caused by the re-encoding of the zero value is extremely small because the zero value is multi-dimensionalized in this embodiment.

Further, a consecutive length number 0 appears most frequently in a general image, and also in a case where the consecutive length number 0 frequently appears, the compression ratio hardly declines in this embodiment because information as to whether the consecutive length number is zero or at least one is multi-dimensionalized as flag information. Further, multi-dimensionalization of these contributes to an enhancement in the compression ratio all the more because whether the consecutive length number becomes one or more has a high correlativity with significativity of the LH, the HL, and the HH coefficients (for example, when the values are all zero, a probability that the consecutive length becomes one or more is high).

Additionally, in this embodiment, the explanation was made of combination of the flags of the U component and the V component of each of LH and HL by exemplifying the YCbCr (YUV) expressive color representation, and when the expressive color representations other than it (for example, color difference components, i.e. a and b* in the case of L*a*b*) are employed, the component counterparts each of which has a correlativity in frequency of the zero value with the other are effectively combined.

Further, it is the to-be-encoded coefficient memory initialized in each hierarchy that is firstly encoded in each hierarchy in this embodiment. Among them, the flag bits of the LH, the HL, and the HH coefficients except for the flag bit for the consecutive length, which have a fixed initial value, becomes redundant when they are outputted as a code. Thus, only the consecutive length may be subjected to the variable-length encoding and outputted in the initial code output of each hierarchy.

Modification Example of the Third Embodiment

Additionally, as a method of determining the consecutive length, in addition to the method described in the third embodiment, the method is employable of determining the case that all components of LH, HL, and HH are zero to be a consecutive length. In this consecutive length determining technique, the compression ratio in the natural image is slightly enhanced as compared with the technique of counting the consecutive length number of which a value is identical. However, the compression ratio greatly lowers in the graphic image.

Next, the fourth embodiment of the present invention will be explained in details by making a reference to accompanied drawings.

Figure 7:
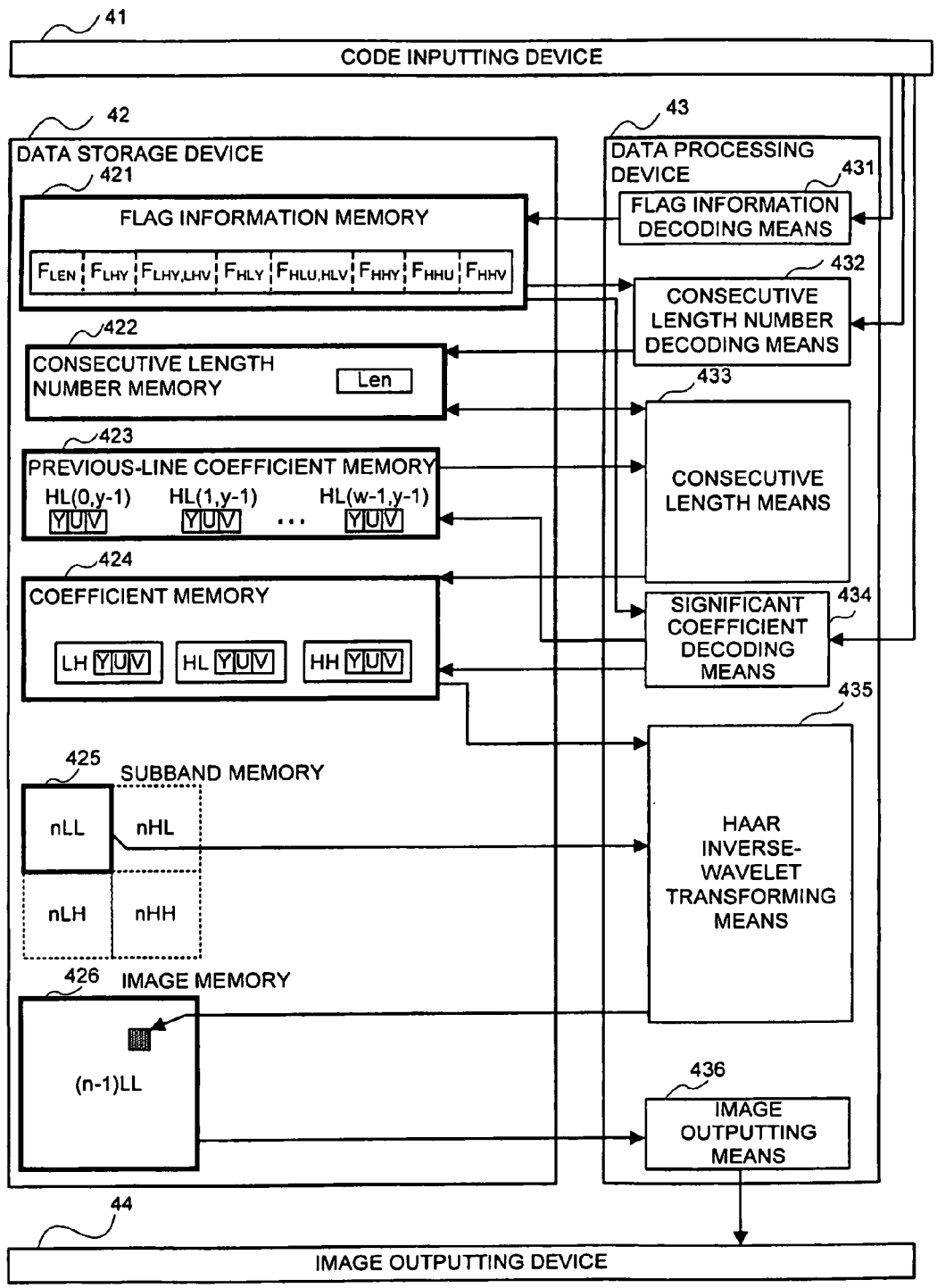
FIG. 7 is a block diagram of a fourth embodiment of the present invention.

Upon making a reference to FIG. 7, the fourth embodiment of the present invention is configured of a code inputting device 41, a data storage device 42, a data processing device 43 that operates under control of a program control, and an image outputting device 44.

The data storage device 42 includes a flag information memory 421, a consecutive length number memory 422, a previous-line coefficient memory 423, a coefficient memory 424, a subband memory 425, and an image memory 426.

The flag information memory 421 stores the flag information decoded by the data processing device 43.

The zero value is stored as an initial value in the consecutive length number memory 422 at the time of decoding with respect to each hierarchy, and thereafter, the decoded consecutive length is appropriately stored.

The previous-line coefficient memory 423 has a capacity capable of holding a one-line portion of the HL subband of a hierarchy that becomes a target of encoding, and only the zero value is stored as an initial value in it at the time of decoding with respect to each hierarchy.

The coefficient memory 424 has a capacity capable of holding one or more of each coefficient value of each of LH, HL, and HH, and only the zero value is stored as an initial value in it at the time of decoding with respect to each hierarchy.

It is assumed that the subband memory 425 has a capacity capable of holding only the LL subband and has a direct-current component of the image pre-stored therein.

The image memory 426 stores the image data decoded by the data processing device 43.

The data processing device 43 includes a flag information decoding means 431, a consecutive length number decoding means 432, a consecutive length means 433, a significant coefficient decoding means 434, an HAAR inverse-wavelet transforming means 435, and an image outputting means 436.

Each of these means operates according to the following described roughly.

The flag information decoding means 431 acquires and decodes the variable-length code data from the code inputting device 41, and stores a decoding result in the flag information memory 421.

The consecutive length number decoding means 432 acquires and decodes the variable-length code data from the code inputting device 41, and stores a decoding result in the consecutive length number memory 422.

The consecutive length means 433 reads out the consecutive length number from the consecutive length number memory 422, and determines whether it is non-zero. When the consecutive length number is non-zero, the consecutive length means 433 decrements the consecutive length number, thereby to update the consecutive length number memory 422, and transcribes the HL coefficient value of an identical X coordinate in the previous-line coefficient memory 423 to the HL coefficient of the coefficient memory 424.

The significant coefficient decoding means 434 reads out the flag information from the flag information memory 421. Further, it determines whether each component (Y, U, and V) of the coefficients (LH, HL, and HH) of an identical space coordinate in an identical hierarchy is significant, responding to truth or falsehood of the each bit value of the flag information. It acquires and decodes the variable-length code data with respect to the component of the coefficient of which the determination result is significant from the code inputting device 41, and stores it in the coefficient memory 424. The significant coefficient decoding means 434 stores the value as zero with respect to the component of the coefficient of which the determination result is non-significant in the coefficient memory 424. Additionally, the flags of the U component and the V component of each of the LH coefficient and HL coefficient have been integrated into a one-bit flag, so the significant coefficient decoding means 434 decodes both of the U component and the V component in the case that the flag has been raised.

As a result, the coefficient value of each component of an identical space coordinate in an identical hierarchy is decoded to the coefficient memory 424.

The HAAR inverse-wavelet transforming means 435 reads out the coefficient values of the LH, the HL, and the HH subbands from the coefficient memory 424, and reads out the coefficient value of the LL subband that corresponds to an identical space coordinate in an identical hierarchy from the subband memory 425. In addition hereto, it performs an HAAR inverse-wavelet transform for these values, and outputs a result to the image memory 426.

The image outputting means 436 reads out the image data from the image memory 426, and outputs it to the image outputting device 44.

Figure 8:
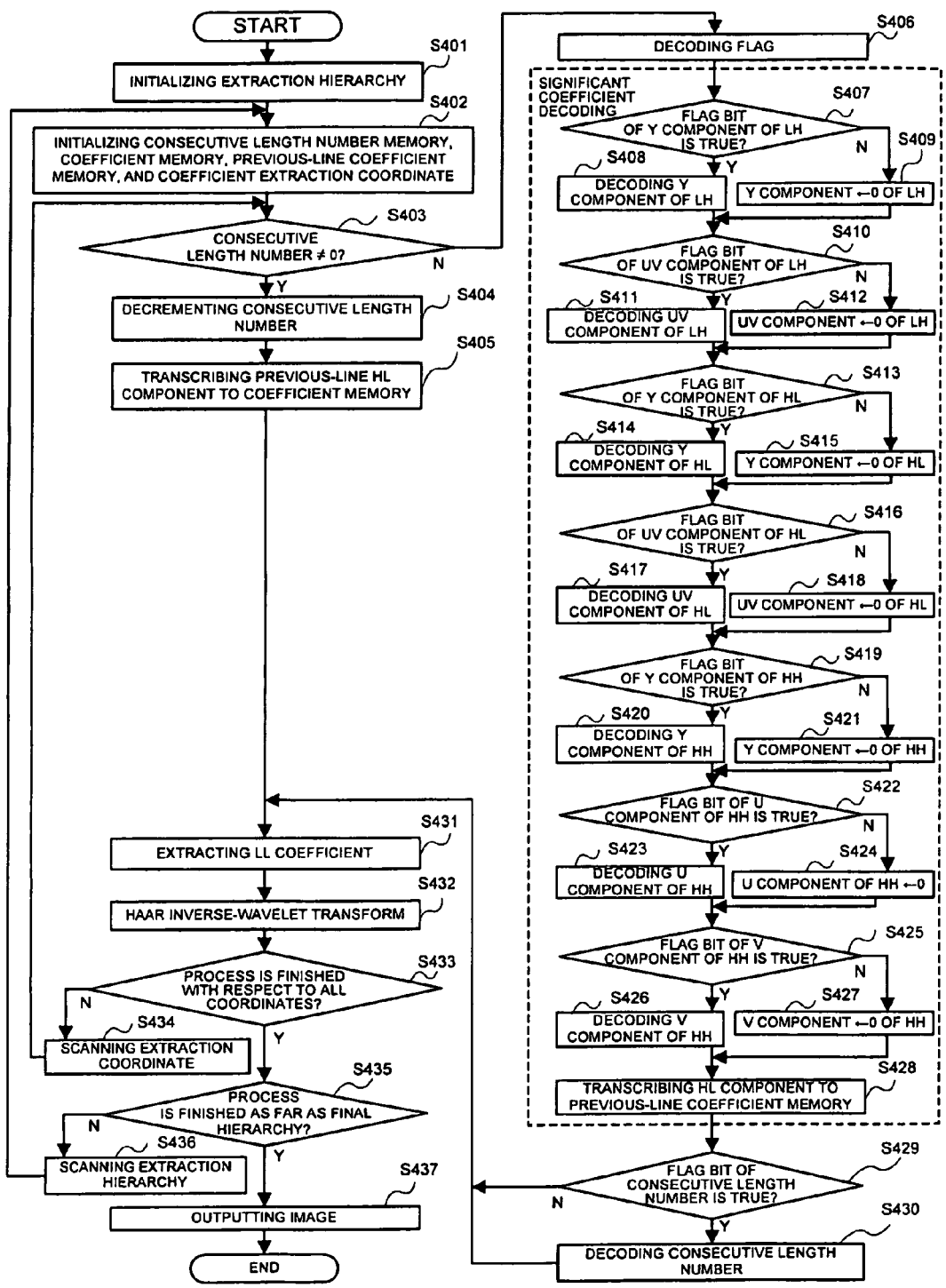
FIG. 8 is a flowchart illustrating an operation of the fourth embodiment of the present invention.

Next, an operation of an entirety of this embodiment will be explained in details by making a reference to flowcharts of FIG. 7 and FIG. 8.

At first, the coefficient decoding hierarchy is initialized to a lowest frequency (step S401).

Next, the consecutive length number memory 422, the coefficient memory 424, and the previous-line coefficient memory 423 are initialized to a zero value. Further, the coefficient extraction coordinate is initialized to an origin (0,0) (step S402).

The consecutive length means 433 reads out the consecutive length number from the consecutive length number memory 422, and determines whether it is non-zero (step S403). When the consecutive length number is zero, it proceeds to the step S406. When the consecutive length number is non-zero, the consecutive length means 433 decrements the consecutive length number, thereby to update the consecutive length number memory 422 (step S404), and transcribes the HL coefficient of the coefficient memory 424 to the HL coefficient value of an identical X coordinate from the previous-line coefficient memory 423 (step S405). And it proceeds to a step S431.

In the step S406, the flag information decoding means 431 acquires and decodes the variable-length code data from the code inputting device 41, and stores a decoding result in the flag information memory 421. Next, the significant coefficient decoding means 434 reads out the flag information from the flag information memory 421, and performs the significant coefficient decoding process (step S407 to step S428).

At first, the significant coefficient decoding means 434 investigates whether the flag of the Y component of the LH coefficient has been raised (step S407). When it has been raised, the significant coefficient decoding means 434 acquires and decodes the variable-length code from the code inputting device 41, and stores a decoding result in the Y component of the LH coefficient within the coefficient memory 424 (step S408). When it has not been raised, the significant coefficient decoding means 434 stores zero in the Y component of the LH coefficient within the coefficient memory 424 (step S409).

Next, the significant coefficient decoding means 434 investigates whether the flag of the UV component of the LH coefficient has been raised (step S410). When it has been raised, the significant coefficient decoding means 434 acquires and decodes two variable-length codes in a row from the code inputting device 41, and stores a decoding result in the U component and the V component of the LH coefficient within the coefficient memory 424 (step S411). When it has not been raised, the significant coefficient decoding means 434 stores zero in the U component and the V component of the LH coefficient within the coefficient memory 424 (step S412).

Next, the significant coefficient decoding means 434 investigates whether the flag of the Y component of the HL coefficient has been raised (step S413). When it has been raised, the significant coefficient decoding means 434 acquires and decodes the variable-length code from the code inputting device 41, and stores a decoding result in the Y component of the HL coefficient within the coefficient memory 424 (step S414). When it has not been raised, the significant coefficient decoding means 434 stores zero in the Y component of the HL coefficient within the coefficient memory 424 (step S415).

Next, the significant coefficient decoding means 434 investigates whether the flag of the UV component of the HL coefficient has been raised (step S416). When it has been raised, the significant coefficient decoding means 434 acquires and decodes two variable-length codes in a row from the code inputting device 41, and stores a decoding result in the U component and the V component of the HL coefficient within the coefficient memory 424 (step S417). When it has not been raised, the significant coefficient decoding means 434 stores zero in the U component and the V component of the HL coefficient within the coefficient memory 424 (step S418).

Next, the significant coefficient decoding means 434 investigates whether the flag of the Y component of the HH coefficient has been raised (step S419). When it has been raised, the significant coefficient decoding means 434 acquires and decodes the variable-length code from the code inputting device 41, and stores a decoding result in the Y component of the HH coefficient within the coefficient memory 424 (step S420). When it has not been raised, the significant coefficient decoding means 434 stores zero in the Y component of the HH coefficient within the coefficient memory 424 (step S421).

Next, the significant coefficient decoding means 434 investigates whether the flag of the U component of the HH coefficient has been raised (step S422). When it has been raised, the significant coefficient decoding means 434 acquires and decodes the variable-length code from the code inputting device 41, and stores a decoding result in the U component of the HH coefficient within the coefficient memory 424 (step S423). When it has not been raised, the significant coefficient decoding means 434 stores zero in the U component of the HH coefficient within the coefficient memory 424 (step S424).

Next, the significant coefficient decoding means 434 investigates whether the flag of the V component of the HH coefficient has been raised (step S425). When it has been raised, the significant coefficient decoding means 434 acquires and decodes the variable-length code from the code inputting device 41, and stores a decoding result in the V component of the HH coefficient within the coefficient memory 424 (step S426). When it has not been raised, the significant coefficient decoding means 434 stores zero in the V component of the HH coefficient within the coefficient memory 424 (step S427).

When the process mentioned above is completed, the significant coefficient decoding means 434 transcribes the HL coefficient value decoded to the coefficient memory 424 to the HL coefficient of an identical X coordinate of the previous-line coefficient memory 423 (step S428).

Further, when the flag bit of the consecutive length number is true, the consecutive length number decoding means 432 decodes the consecutive length number, and stores it in the consecutive length number memory 422 (step S429 and step S430). And it proceeds to a step S431.

In the step S431, the HAAR inverse-wavelet transforming means 435 reads out the coefficient values of the LH, the HL, and the HH subbands from the coefficient memory 424, and reads out the coefficient value of the LL subband that corresponds to an identical space coordinate in an identical hierarchy from the subband memory 425 (step S431). In addition hereto, it performs the HAAR inverse-wavelet transform for these coefficient values, and outputs a result to the image memory 426 (step S432).

Above, it is determined whether the process of the step S403 to the step S432 has been completed with respect to all coordinates (step S433), and when it has not been completed, the decoding coordinates for which the process has not been completed are scanned (step S434), and the operation returns to the step S403.

Above, it is determined whether the process of the step S402 to the step S433 has been completed with respect to all hierarchies (step S435), and when it has not been completed, the data stored in the image memory 426 is regarded as a new LL subband, and is stored in LL of the subband memory 425, and thereafter, the next hierarchy is scanned (step S436) and the operation returns to the step S402.

When the process has been completed with respect to all hierarchies, the image outputting means 436 reads out the image data from the image memory 426, and outputs it to the image outputting device 44 (step S437).

Next, an effect of this embodiment will be explained.

This embodiment is equivalent to a decoding device of the data encoded in the third embodiment.

In addition to an effect of the second embodiment, this embodiment makes it possible to enhance use efficiency of the memory and the bus because the flag information has an eight-bit sequence. Further, the compression ratio can be enhanced owing to the consecutive length.

With the consecutive length of the HL coefficient, an enhancement in consecutiveness and a high-speed operation of a memory access are accomplished by employing not the technique using the consecutive length in a vertical direction, but the sliding dictionary technique of analyzing the coincidence length by making a comparison with the HL coefficient value of the one-previous line.

Further, by not counting/encoding the consecutive length values individually for each of the Y, U, and V components of each of the LH, HL, and HH coefficients, but handling them in a lump, simplification of the process and an enhancement in the compression ratio are accomplished.

Further, immediately after decoding the LH, HL, and HH coefficients of an identical hierarchy and yet an identical space coordinate, the above coefficient is employed, thereby enabling the inverse-wavelet operation to be carried out because the HAAR is employed as a basis of the wavelet transform. For this reason, the content of the coefficient memory does not need to be evacuated into the subband memory temporarily, the memory capacity can be reduced, and a high-speed operation accompanied by avoidance of access to an actual memory such as DRAM is accomplished.

Modification Example of the Fourth Embodiment

Like the modification example of the third embodiment, the decoding device is thinkable for decoding the coding sequence encoded with the method of determining the case that all components of LH, HL, and HH are zero to be a consecutive length. In this case, when the value of the consecutive length number memory 422 is not zero, the flag information decoding means 431 and the significant coefficient decoding means 434 do not perform the decoding process, and the consecutive length means 433 decreases the value of the consecutive length number memory 422 and outputs all components of all coefficients as zero.

In the foregoing first to fourth embodiments, the case that the decoding device decodes the image data encoded by the encoding device was explained, and it is also possible that one communication terminal having the encoding device and the decoding device built-in therein makes two-way image communication with the other communication terminal. Hereinafter, the communication terminal (for example, a mobile telephone with a camera, or the like) to which a camera and a display have been connected will be exemplified for explanation.

Figure 9:
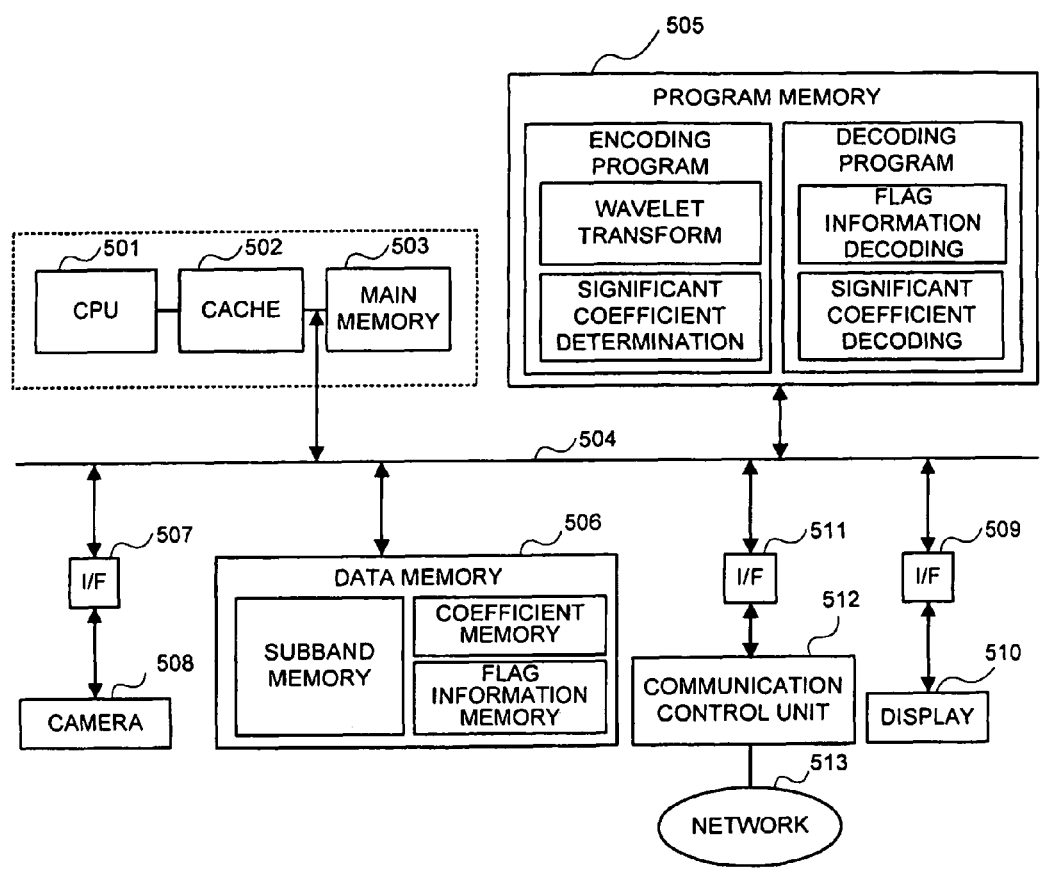
FIG. 9 is a block diagram of a fifth embodiment of the present invention.

FIG. 9 is a block diagram of a two-way communication terminal into which the encoding and decoding device in accordance with a fifth embodiment of the present invention has been built-in. The terminal, which has a CPU 501 as a program control processor provided therein, is connected to a cache memory 502 and a main memory 503 via an internal bus. The internal bus is furthermore connected to an external bus 504 via a port, and a program memory 505 having a necessary program stored therein, a data memory 506, an interface 507 for connecting a camera 508, an interface 509 for connecting a display 510, an interface 511 for connecting a communication control unit 512, etc. are connected to the external bus 504, respectively. A communication control unit 512 is connected to a network 513. On the assumption that the terminal is a mobile telephone, the communication control unit 512 includes a wireless communication unit and a channel control unit, and the network 513 is a mobile communication network.

An encoding program, a decoding program, a main program for controlling an entire operation of the communication terminal, etc. have been stored in the program memory 505. The encoding program is a program that is signified by the flowchart shown in any of FIG. 2 and FIG. 6 explained in the first and third embodiments, the decoding program is a program that is signified by the flowchart shown in any of FIG. 4 and FIG. 8, and each of the above-described processes of the encoding program and the decoding program is performed under management of the process by the main program.

The data memory 506 includes a subband memory, a coefficient memory, and a flag information memory. The subband memory is, for example, the subband memory 121 of FIG. 1, and the subband memory 223 of FIG. 3. The coefficient memory is, for example, the extraction coefficient memory 122 of FIG. 1, and the coefficient memory 222 of FIG. 3. The flag information memory is, for example, the flag information memory 123 of FIG. 1, and the flag information memory 221 of FIG. 3.

Further, the camera 508 corresponds to the image inputting devices 11 and 31 in the encoding device of FIG. 1 and FIG. 5, respectively, and the display 510 corresponds to the image outputting devices 24 and 44 in the decoding device of FIG. 3 and FIG. 7, respectively. The image data acquired with the camera, as described above, is wavelet-transformed and encoded, and its coding sequence is transmitted to a counterpart terminal via the network 513. On the contrary, the coding sequence of the image data received from the counterpart side, as described above, is decoded, inverse-wavelet-transformed and displayed on the display 510. The detailed operation was already explained, and the cache memory 502 can be utilized as a coefficient memory in any case.

The encoding device in accordance with the present invention, as described above, can be realized by executing each control program over the CPU, and also can be realized with hardware. Hereinafter, a configuration in which each process of the foregoing first embodiment is performed in a hardware manner will be exemplified, and the third embodiment as well is configured similarly.

Figure 10:
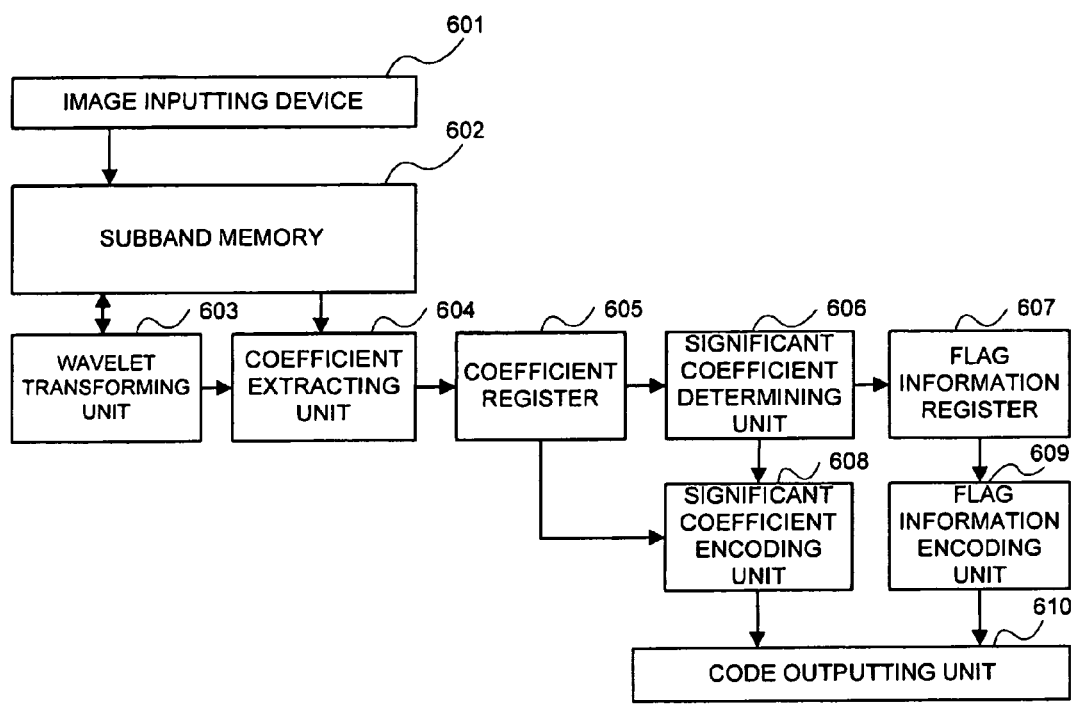
FIG. 10 is a block diagram of a sixth embodiment of the present invention.

FIG. 10 is a block diagram illustrating one example of the encoding device in accordance with a sixth embodiment of the present invention. The image data inputted by an image inputting device 601 such as a camera is stored in a subband memory 602, and is sequentially wavelet-transformed by a wavelet transforming unit 603 as described above. The subband coefficients LL, LH, HL, and HH obtained in such a manner are stored in the subband memory 602, and in addition hereto, a coefficient extracting unit 604 extracts sets of the LH, HL and HH coefficients of an identical hierarchy and yet an identical coordinate from the subband memory 602, and then stores these sets of the coefficients into a coefficient register 605. It is determined by a significant coefficient determining unit 606 whether each of the sets of the coefficients stored in the register 605 is significant, and the sets of the coefficients are stored in a flag information register 607. A flag information encoding unit 609 subjects the content of the flag information register 607 to the variable-length encoding, and outputs it to a code outputting unit 610. A significant coefficient encoding unit 608 subjects only the significant coefficient to the variable-length encoding, out of the coefficient register 605, and outputs it to the code outputting unit 610.

The decoding device in accordance with the present invention, as described above, can be realized by executing each control program over the CPU, and also can be realized with hardware. Hereinafter, a configuration in which each process of the foregoing second embodiment is performed in a hardware manner will be exemplified, and the fourth embodiment as well is configured similarly.

Figure 11:
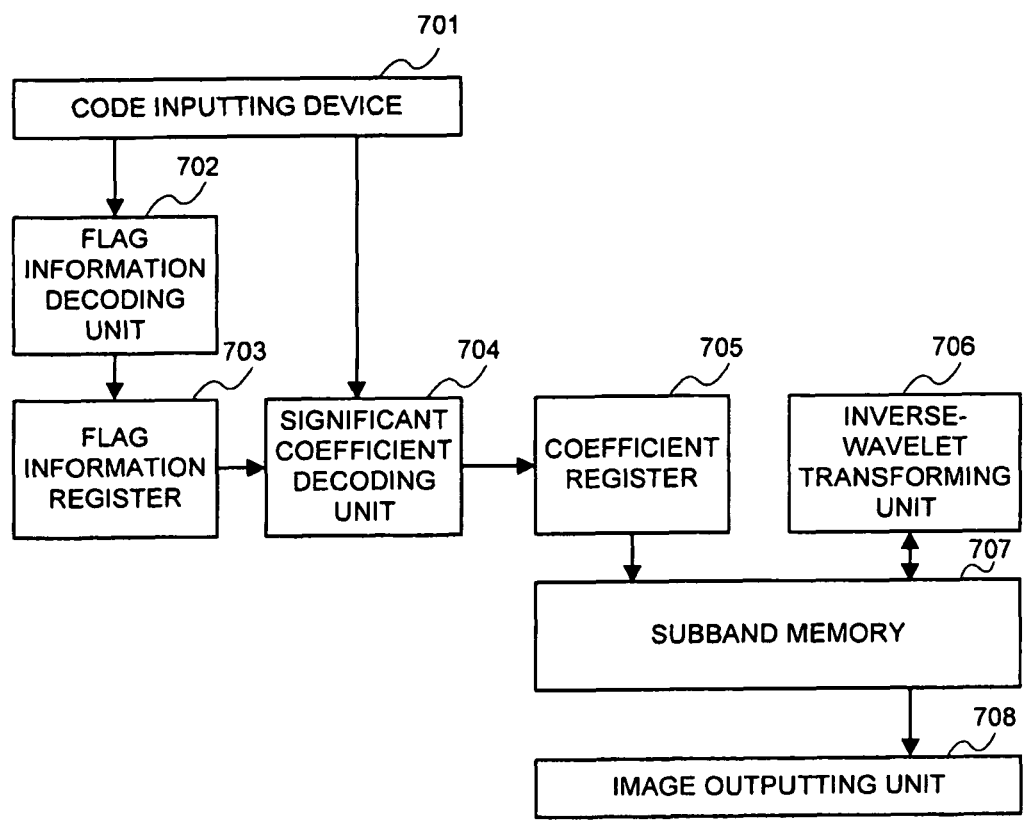
FIG. 11 is a block diagram of a seventh embodiment of the present invention.

FIG. 11 is a block diagram illustrating one example of the decoding device in accordance with a seventh embodiment of the present invention. The coding sequence sent out by the encoding device in accordance with the sixth embodiment is inputted by a code inputting device 701. A flag information decoding unit 702 decodes the variable-length code, and stores it in a flag information register 703. A significant coefficient decoding unit 704 determines from each bit of the flag information register 703 whether each coefficient is significant, decodes the variable-length code with respect to the significant coefficient, thereby to store it in a coefficient register 705, and store the zero value in the coefficient register 705 with respect to the coefficient that is not significant. The value of the coefficient register 705 generated in such a manner is stored as a coefficient of an identical hierarchy and yet an identical space coordinate in a subband memory 707. An inverse-wavelet transforming unit 706 reads out the LH, HL, and HH subbands from the subband memory 707, and stores a result obtained by performing the inverse-wavelet transform in the subband memory 707. The LL subband finally obtained is outputted to an image outputting unit 708.

The present invention makes it possible to accomplish an excellent compression ratio even though the pre-fix code such as a Huffman code is employed as an entropy encoding technique because information of significance/non-significance of the coefficient of an identical space coordinate in an identical hierarchy is multi-dimensionalized, thereby to generate flag information, and only the significant coefficient is subjected to the variable-length encoding after the flag information is subjected to the variable-length encoding.

EXAMPLE

Hereinafter, a specific example of the first embodiment of the present invention will be explained by making a reference to FIG. 12.

Figure 12:
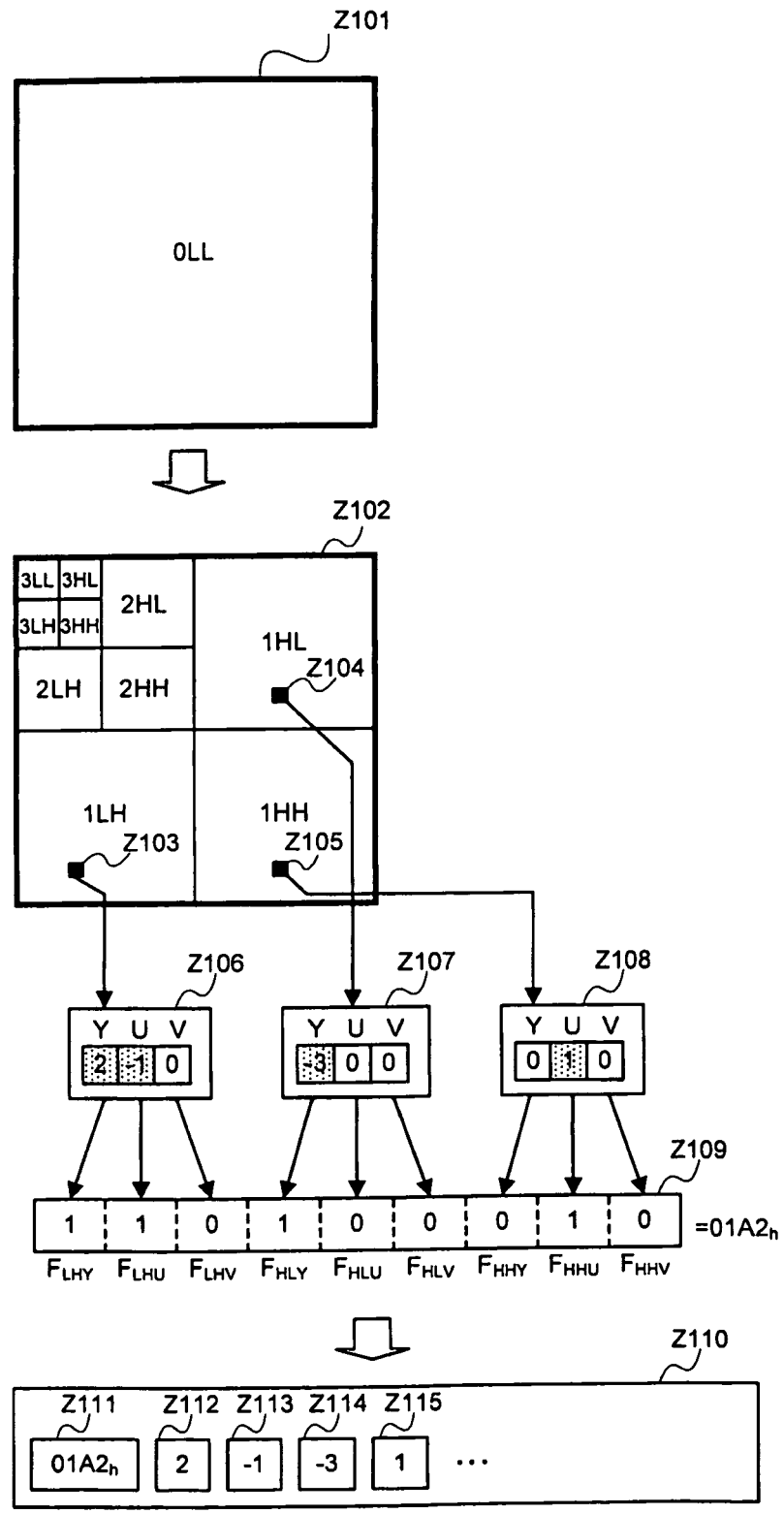
FIG. 12 is a view illustrating an operation of the first embodiment schematically.

FIG. 12 is a view schematically illustrating an encoding operation in accordance with the first embodiment of the present invention. In this example, it is assumed that a personal computer is provided as a data processing device, a semiconductor memory (which is included in the personal computer) as a data storage device, and a magnetic disc device as a code outputting device. Further, it is assumed that the image data is given as a file over the magnetic disc device.

At first, the image data is loaded from the magnetic disc device, and is stored as a 0LL subband Z101 in the subband memory.

The wavelet transforming means octave-divides the 0LL subband Z101 into a subband Z102 of each hierarchy, which is constituted within the subband memory.

The coefficient extracting means extracts the coefficient values that correspond to an identical hierarchy/an identical space coordinate from the LH, HL, and HH subbands. Herein, an LH coefficient Z106, an HL coefficient Z107, and an HH coefficient Z108 are extracted and stored in the extraction coefficient memory.

The significant coefficient determining means determines whether each color component (Y, U, and V) of the LH coefficient Z106, the HL coefficient Z107, and the HH coefficient Z108 is significant (non-zero), and when it is significant, raises a corresponding bit flag, out of a flag information register Z109. Thereby, for example, with LH, the bits of FLHY and FLHU become one because the Y and U components are non-zero, and the bit of FLHV becomes zero because the V component is zero.

The value of the flag information register Z109 obtained in such a manner becomes 01A2h (hexadecimal notation). The flag information encoding means subjects this value to the variable-length encoding, and outputs it as a code Z111 to a file Z110.

In addition hereto, the significant coefficient encoding means extracts and subjects only the significant coefficient to the variable-length encoding out of the LH coefficient Z106, the HL coefficient Z107, and the HH coefficient Z108, and outputs it to the file Z110. For example, Y and U of the LH coefficient Z106 are outputted as variable-length codes Z112 and Z113, respectively, because they are non-zero. Further, likewise, Y of the HL coefficient Z107 is outputted as a variable-length code Z114 because it is non-zero. U of the HH coefficient Z108 is outputted as a variable-length code Z115 because it is non-zero.

In such a manner, the similar process is performed with respect to all space coordinates/hierarchies, and the encoding is completed.

Hereinafter, a specific example of the second embodiment of the present invention will be explained by making a reference to FIG. 13.

Figure 13:
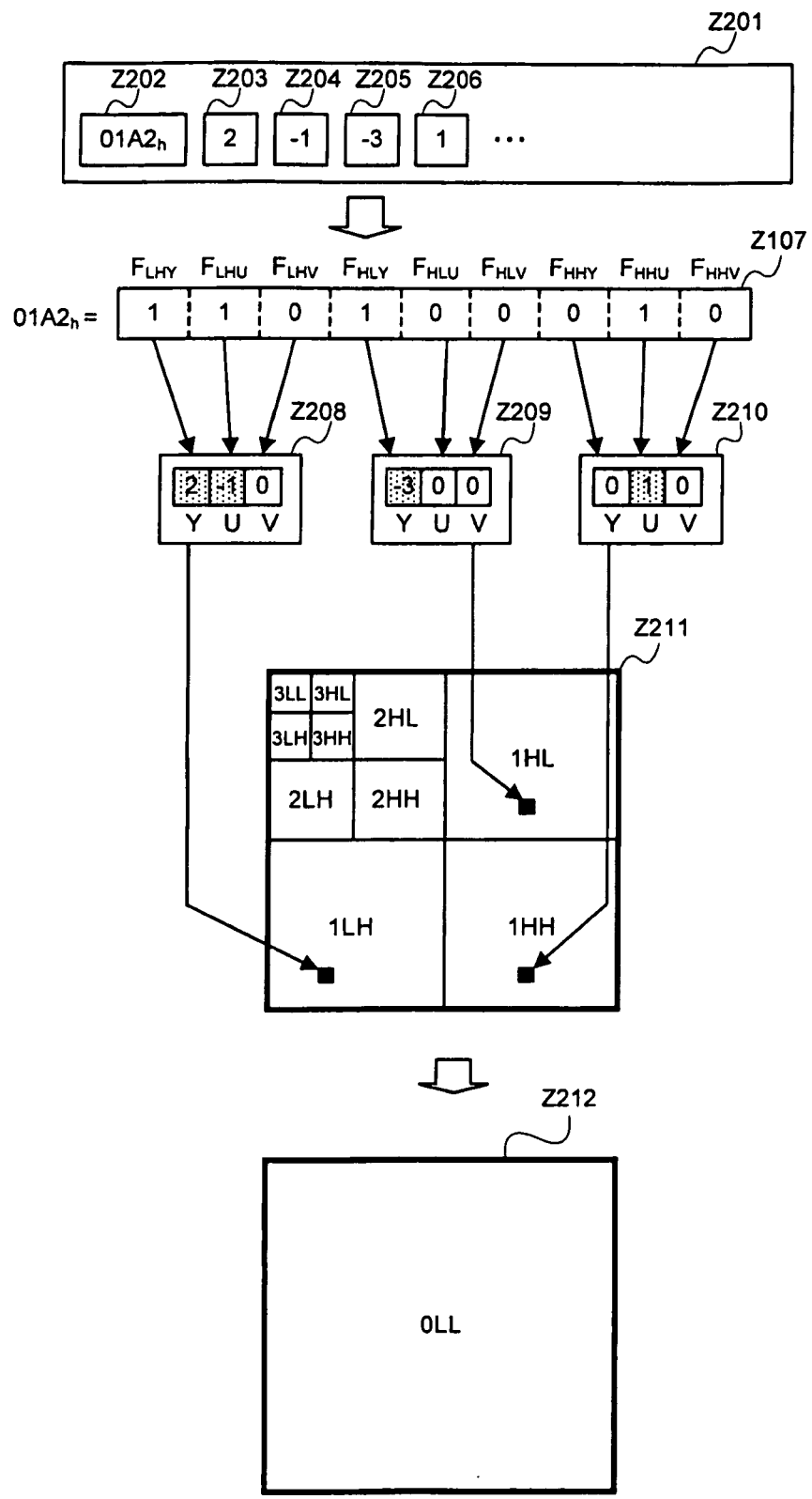
FIG. 13 is a view illustrating an operation of the second embodiment schematically.

FIG. 13 is a view schematically illustrating a decoding operation in accordance with the second embodiment of the present invention. In this example, it is assumed that a personal computer is provided as a data processing device, a semiconductor memory (which is included in the personal computer) as data storage device, and a magnetic disc device as an image outputting device. Further, it is assumed that the code data is given as a file Z201 over the magnetic disc device.

The flag information encoding means reads out and decodes a variable-length data Z202 from the code data Z201, and stores it in a flag information memory Z207. Herein, a decoding result of the flag information is defined as 01A2h (hexadecimal notation).

The significant coefficient decoding means makes a reference to each bit of the flag information memory Z207, when the bit has been raised, regards the coefficient value corresponding to its bit position as significant, reads out the variable-length code from the code data Z201, and decodes it, thereby to store it in an LH coefficient memory Z208, an HL coefficient memory Z209, and an HH coefficient memory Z210. The significant coefficient decoding means, when the bit has been not raised, writes zero into the coefficient value that corresponds to its bit position.

For example, the significant coefficient decoding means reads out and decodes a variable-length code Z203, thereby to obtain a coefficient value 2, and stores the coefficient value 2 in the Y component of the LH coefficient memory Z208 because the bit of FLHY has been raised. Likewise, the significant coefficient decoding means reads out and decodes variable-length codes Z204, Z205, and Z206, and stores a result in the U component of the LH coefficient memory, the Y component of the HL coefficient memory, and the U component of the HH coefficient memory, respectively, because the bits of FLHU, FHLY, and FHHU have been raised. The zero value is stored in the components other than these because the bit has not been raised.

The LH, HL, and HH coefficient values obtained in such a manner are sequentially outputted to an identical space coordinate of an identical hierarchy in a subband memory Z211.

When the decoding is completed with respect to each hierarchy, the inverse-wavelet transform is performed by the inverse-wavelet transforming means, and a result is stored in an image memory Z212.

When the process above is completed with respect to all hierarchies, the final image is outputted to the file.

Hereinafter, a specific example of the third embodiment of the present invention will be explained by making a reference to FIG. 14.

Figure 14:
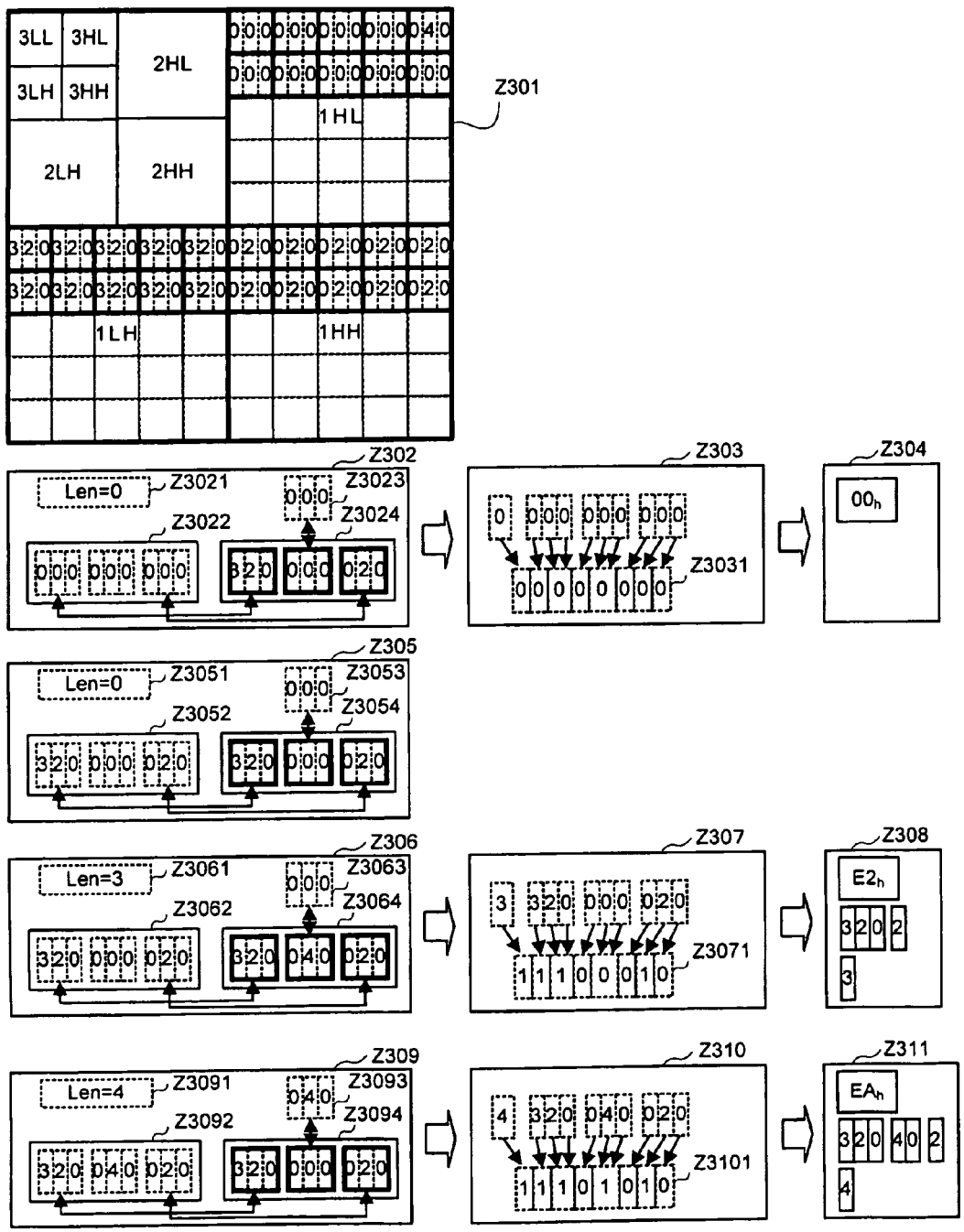
FIG. 14 is a view illustrating an operation of the third embodiment schematically.

FIG. 14 is a view schematically illustrating the encoding operation in accordance with the third embodiment of the present invention. In this example, it is assumed that a personal computer is provided as a data processing device, a semiconductor memory (which is included in the personal computer) as data storage device, and a magnetic disc device as a code outputting device. Further, it is assumed that the image data is given as a file over the magnetic disc device.

At first, the image data is loaded from the magnetic disc device, and a subband Z301 of each hierarchy octave-divided by the HAAR wavelet transforming means is constituted within the subband memory. From now on, the LH, HL, and HH coefficients of each hierarchy are sequentially encoded, and the encoding of 1LH, 1HL, and 1HH will be explained below.

Further, in the following, it is assumed that the maximum value of the consecutive length number is 255.

Each two lines in the upper stage of each subband of 1LH, 1HL, and 1HH of Z301 indicates the Y, U, and V components of each coefficient in each space coordinate. For example, in a coordinate (x,y)=(0,0), it is illustrated that the Y component, the U component, and the V component of the LH coefficient are three, two, and zero, respectively, the Y component, the U component, and the V component of the HL coefficient are zero, zero, and zero, respectively, and the Y component, the U component, and the V component of the HH coefficient are zero, two, and zero, respectively.

At first, a consecutive length number memory Z3021 is initialized to zero, and a to-be-encoded coefficient memory Z3022 is all initialized to zero. Further, a previous-line coefficient memory Z3023 is all initialized to zero. Further, the coefficient extraction coordinate is initialized to (0,0).

The process in the coordinate (0,0) is shown in Z302 to Z304.

The coefficient extracting means extracts the coefficient values that correspond to an identical hierarchy/an identical space coordinate from the LH, HL, and HH subbands. An LH coefficient (3,2,0), an HL coefficient (0,0,0), and an HH coefficient (0,2,0) of the coordinate (0,0) are extracted, and stored in an extraction coefficient memory Z3024. Thereby, each coefficient memory and the consecutive length number memory come into a status of Z302.

The consecutive length determining means investigates whether the LH coefficient (3,2,0) and the HH coefficient (0,2,0) are equal to an LH coefficient (0,0,0) and an HH coefficient (0,0,0) of the to-be-encoded coefficient memory Z3022, respectively, and further investigates whether the HL coefficient (0,0,0) is equal to the previous-line coefficient memory Z3023 that corresponds to x coordinate=0.

Herein, the values of the LH and HH coefficients differ, so the consecutive length condition is not satisfied. For this, the significant coefficient determining process is performed. An operation of the significant coefficient determining process is shown in Z303.

The significant coefficient determining means investigates whether the coefficient value of the to-be-encoded coefficient memory Z3022 and the value of the consecutive length number memory Z3021 are non-zero, and stores a result in a flag information memory Z3031. Herein, all values are zero, so the flag information becomes zero.

The flag information encoding means subjects the value of the flag information memory Z3031 to the variable-length encoding.

The significant coefficient encoding means subjects only the significant coefficient to the variable-length encoding from the to-be-encoded coefficient memory Z3022. Herein, no significant coefficient exists, so no code of the coefficient is generated.

The consecutive length number encoding means investigates whether the consecutive length number memory Z3021 is non-zero, and when it is non-zero, subjects the consecutive length number to the variable-length encoding. Herein, the consecutive length number is zero, so no code of the consecutive length number is generated.

With this, the variable-length code of Z304 is generated in the coordinate (0,0), and outputted to the file.

The consecutive length number memory is initialized to zero, and the previous-line coefficient memory Z3023 that corresponds to x coordinate=0 is updated with the HL coefficient value (0,0,0) of the extraction coefficient memory Z3024, and each coefficient value of the extraction coefficient memory Z3024 is transcribed to the to-be-encoded coefficient memory Z3022.

Above, the process in the coordinate (0,0) is completed.

Next, the process in a coordinate (1,0) is shown in Z305.

An LH coefficient (3,2,0), an HL coefficient (0,0,0), and an HH coefficient (0,2,0) of the coordinate (1,0) are extracted, and stored in an extraction coefficient memory Z3054. Thereby, each coefficient memory and the consecutive length number memory come into a status of Z305.

The consecutive length determining means investigates whether the LH coefficient (3,2,0) and the HH coefficient (0,2,0) are equal to an LH coefficient (3,2,0) and an HH coefficient (0,2,0) of a to-be-encoded coefficient memory Z3052, respectively, and further investigates whether the HL coefficient (0,0,0) is equal to a previous-line coefficient memory Z5053 that corresponds to x coordinate=1. As a result of determination, these are all equal, and further a consecutive length number Z3051 is less than the maximum value (255), so the consecutive length condition is satisfied. The consecutive length determining means increments the value of the consecutive length number memory Z3021 to one, and the process in the coordinate (1,0) is completed.

In a coordinate (2,0) to a coordinate (3,0), the consecutive length continues similarly to the coordinate (1,0), and the consecutive length number becomes three.

The process in a coordinate (4,0) is shown in Z306 to Z308.

An LH coefficient (3,2,0), an HL coefficient (0,4,0), and an HH coefficient (0,2,0) of the coordinate (4,0) are extracted, and stored in an extraction coefficient memory Z3064. Thereby, each coefficient memory and the consecutive length number memory come into a status of Z306.

The consecutive length determining means investigates whether the LH coefficient (3,2,0) and the HH coefficient (0,2,0) are equal to an LH coefficient (3,2,0) and an HH coefficient (0,2,0) of a to-be-encoded coefficient memory Z3062, and further investigates whether the HL coefficient (0,4,0) is equal to a previous-line coefficient memory Z3063 that corresponds to x coordinate=4.

Herein, the values of the HL coefficients differ, so the consecutive length condition is not satisfied. Thus, the significant coefficient determining process is performed from now on. An operation of the significant coefficient determining process is shown in Z307.

The significant coefficient determining means investigates whether the coefficient value of the to-be-encoded coefficient memory Z3062 and the value of a consecutive length number memory Z3061 are non-zero, and stores a result in a flag information memory Z3071.

The most significant bit of the flag information memory Z3071 is a flag of the consecutive length number. The consecutive length number is three, that is, non-zero, so one is stored in the flag bit.

The second most significant bit of the flag information memory Z3071 is a flag of the Y component of LH. The Y component of LH is three, that is, non-zero, so one is stored in the flag bit.

The third most significant bit of the flag information memory Z3071 is a flag of the UV component of LH. The U and V components of LH, which are two and zero, respectively, that is, include a non-zero value, so one is stored in the flag bit.

The fourth most significant bit of the flag information memory Z3071 is a flag of the Y component of HL. The Y component of HL is zero, so zero is stored in the flag bit.

The fifth most significant bit of the flag information memory Z3071 is a flag of the UV component of HL. The U and V components of HL are zero and zero, respectively, that is, all are a zero value, so zero is stored in the flag bit.

The sixth most significant bit of the flag information memory Z3071 is a flag of the Y component of HH. The Y component of HH is zero, so zero is stored in the flag bit.

The seventh most significant bit of the flag information memory Z3071 is a flag of the U component of HH. The U component of HH is two, that is, non-zero, so one is stored in the flag bit.

The eighth most significant bit of the flag information memory Z3071 is a flag of the V component of HH. The V component of HH is zero, so zero is stored in the flag bit.

The flag information encoding means subjects the value (E2h, hexadecimal notation) of the flag information memory Z3071 generated above to the variable-length encoding.

The significant coefficient encoding means subjects only the significant coefficient to the variable-length encoding from the to-be-encoded coefficient memory Z3062. When one or both of the U and V components of each of LH and HL is a non-zero value, the significant coefficient encoding means subjects both of the U and the V components to the variable-length encoding. Herein, a Y component (3) and a UV component (2,0) of LH, and a U component (2,0) of HH are encoded.

The consecutive length number encoding means investigates whether the consecutive length number memory Z3061 is non-zero, and when it is non-zero, subjects the consecutive length number to the variable-length encoding. Herein, the consecutive length number is three, so the code of the consecutive length number 3 is generated.

With this, the variable-length code of Z308 is generated in the coordinate (4,0), and outputted to the file.

The consecutive length number memory Z3061 is initialized to zero, and the previous-line coefficient memory Z3063 that corresponds to x coordinate=0 is updated with the HL coefficient (0,4,0) of the extraction coefficient memory Z3064, and each coefficient value of the extraction coefficient memory Z3064 is transcribed to the to-be-encoded coefficient memory Z3062.

Above, the process in the coordinate (4,0) is completed.

In a coordinate (0,1) to a coordinate (3,1), the consecutive length continues similarly to the coordinate (1,0), and the consecutive length number becomes four.

The process in a coordinate (4,1) is shown in Z309 to Z311.

An LH coefficient (3,2,0), an HL coefficient (0,0,0), and an HH coefficient (0,2,0) of the coordinate (4,1) are extracted, and stored in an extraction coefficient memory Z3094. Thereby, each coefficient memory and the consecutive length number memory come into a status of Z309.

The consecutive length determining means investigates whether the LH coefficient (3,2,0) and the HH coefficient (0,2,0) are equal to an LH coefficient (3,2,0) and an HH coefficient (0,2,0) of a to-be-encoded coefficient memory Z3092, and further investigates whether the HL coefficient (0,0,0) is equal to a previous-line coefficient memory Z3093 that corresponds to x coordinate=4.

The previous-line coefficient memory Z3093 corresponding to x coordinate=4, which has been overwritten by the HL coefficient (0,4,0) at the time of process in the coordinate (0,4), has become (0,4,0). For this, the value of the HL coefficient differs, so the consecutive length condition is not satisfied. Thus, from now on, the significant coefficient determining process is performed. An operation of the significant coefficient determining process is shown in Z310.

The significant coefficient determining means investigates whether the coefficient value of the to-be-encoded coefficient memory Z3092 and the value of a consecutive length number memory Z3091 are non-zero, and stores a result in a flag information memory Z3101.

The consecutive length number is four, so one is stored in the flag bit of the consecutive length number. The Y component of LH is three, so the flag bit becomes one. The UV component of LH is (2,0), so the flag bit becomes 1. The Y component of HL is zero, so the flag bit becomes zero. The UV component of HL is (4,0), so the flag bit becomes one. The Y component of HH is zero, so the flag bit becomes zero. The U component of HH is two, so the flag bit becomes one. The V component of HH is zero, so the flag bit becomes zero.

The flag information encoding means subjects the value (EAh, hexadecimal notation) of the flag information memory Z3101 generated above to the variable-length encoding.

The significant coefficient encoding means subjects only the significant coefficient to the variable-length encoding from the to-be-encoded coefficient memory Z3092. Herein, the Y component (3) and the UV component (2,0) of LH, the UV component (4,0) of HL, and the U component (2) of HH are encoded.

The consecutive length number encoding means investigates whether the consecutive length number memory Z3091 is non-zero, and when it is non-zero, subjects the consecutive length number to the variable-length encoding. Herein, the consecutive length number is four, so the code of the consecutive length number 4 is generated.

With this, the variable-length code of Z311 is generated in the coordinate (4,1), and outputted to the file.

The consecutive length number memory is initialized to zero, and the previous-line coefficient memory Z3093 that corresponds to x coordinate=0 is updated with the HL coefficient (0,0,0) of the extraction coefficient memory Z3094, and each coefficient value of the extraction coefficient memory Z3094 is transcribed to the to-be-encoded coefficient memory Z3092.

Above, the process in the coordinate (4,1) is completed.

After the similar process is performed with respect to all space coordinates in such a manner, the to-be-encoded coefficient memory and the consecutive length number for which the encoding has not been carried out yet are encoded, and the encoding process with respect to the target hierarchy is all completed.

By performing the process above with respect to all hierarchies, all encoding processes are completed.

Hereinafter, a specific example of the fourth embodiment of the present invention will be explained by making a reference to FIG. 15.

Figure 15:
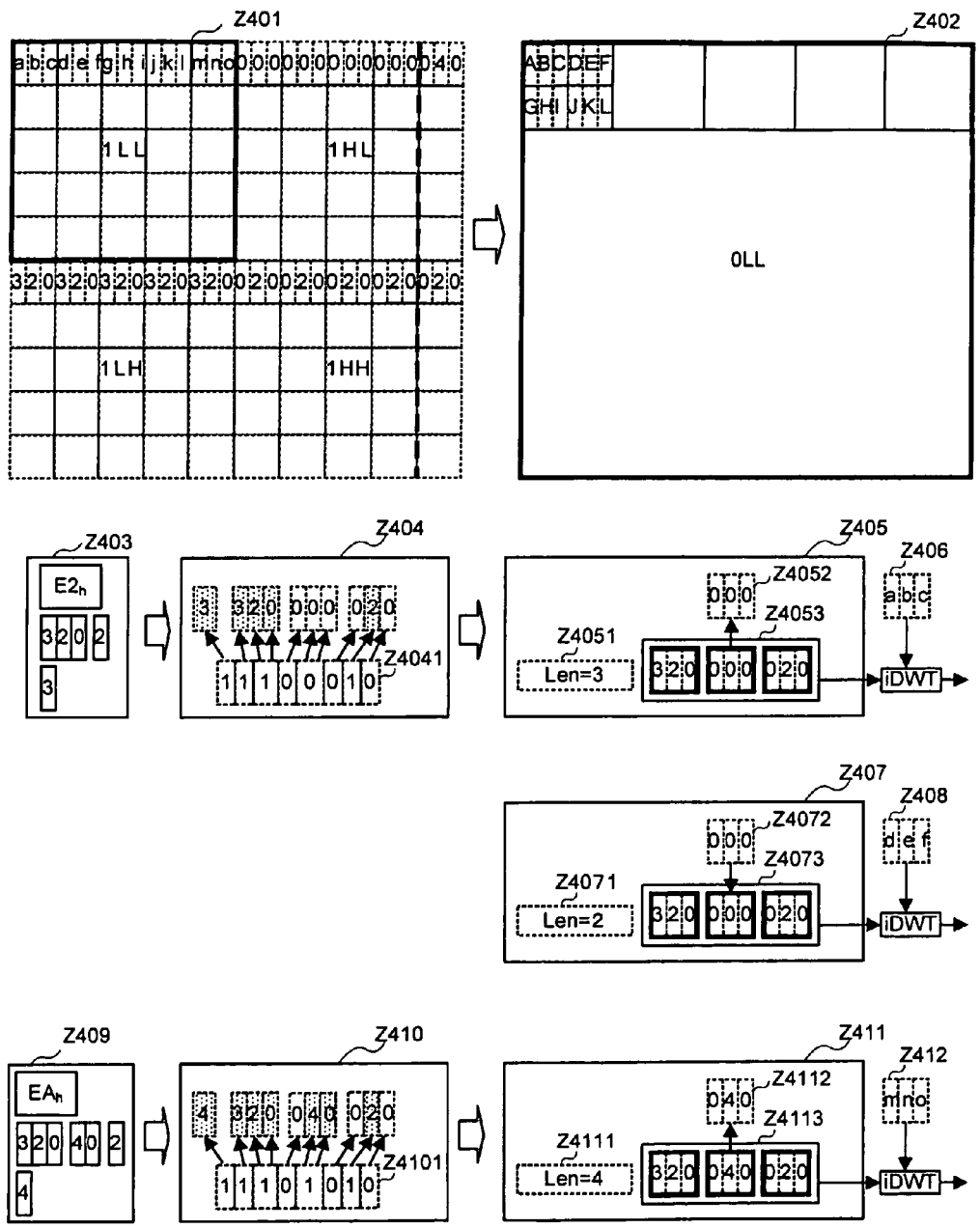
FIG. 15 is a view illustrating an operation of the fourth embodiment schematically.

FIG. 15 is a view schematically illustrating a decoding operation in accordance with the fourth embodiment of the present invention. In this example, it is assumed that a personal computer is provided as a data processing device, a semiconductor memory (which is included in the personal computer) as data storage device, and a magnetic disc device as an image outputting device.

Further, it is assumed that the code data is given as a file over the magnetic disc device.

Hereinafter, it is assumed that the data of 1LL is pre-stored in a subband memory Z401, and the procedure for decoding an image Z402 of 0LL is shown.

The most upper stage of each subband of 1LL, 1LH, 1HL, and 1HH of Z401 indicates the Y, U, and V component values of each coefficient in each space coordinate. For example, it is illustrated that the values of the Y component, the U component, and the V component in the coordinate (0,0) of the LL coefficient stored in the subband memory Z401 are a, b, and c, respectively. Further, it is illustrated that the Y component, the U component, and the V component of the LH coefficient that are obtained in the decoding process in the coordinate (0,0) are three, two, and zero, respectively, the Y component, the U component, and the V component of the HL coefficient are zero, zero, and zero, respectively, and the Y component, the U component, and the V component of the HH coefficient are zero, two, and zero, respectively.

At the time of starting the decoding with respect to the 0LL hierarchy, at first, the consecutive length number memory Z3021 is initialized to zero, and the to-be-encoded coefficient memory Z3022 is all initialized to zero. Further, the previous-line coefficient memory Z3023 is all initialized to zero. Further, the coefficient extraction coordinate is initialized to (0,0).

The process in the coordinate (0,0) is shown in Z403 to Z405.

At first, it is determined by the consecutive length means whether the consecutive length number is non-zero. The consecutive length number is zero in (0,0), so the consecutive length process is not performed.

The flag encoding means reads out a variable-length code Z403, and decodes flag information Z4041.

The significant coefficient decoding means makes a reference to each bit of the flag information memory Z4041, when the bit has been raised, regards the coefficient value corresponding to its bit position as significant, reads out the variable-length code from the code data Z403, and decodes it, thereby to store it in a coefficient memory Z4053. The significant coefficient decoding means, when the bit has not been raised, writes zero into the coefficient value that corresponds to its bit position. Further, the consecutive length number decoding means, when the flag bit corresponding to the consecutive length has been raised, regards the consecutive length number as significant, and decodes the consecutive length number. A series of these processes are shown in Z404.

The value of the flag information memory Z4041 is E2h in the coordinate (0,0). The bit of FLHY (second most significant bit) has been raised, so a coefficient value 3 decoded from the input code Z403 is obtained, and the coefficient value 3 is stored in the Y component of the LH coefficient within the coefficient memory Z4053. Likewise, the bit of FLHU (third most significant bit), the bit of LHV (third most significant bit), and the bit of FHHU (seventh most significant bit) have been raised, so a U component=2 of the LH coefficient, a V component=0 of the LH coefficient, and a U component=2 of the HH coefficient are decoded from the input code Z403, and stored in the U component and the V component of the LH coefficient, and the U component of the HH coefficient value within the coefficient memory Z4053, respectively. The zero value is stored in the components other than it because the bit has not been raised.

Further, the previous-line coefficient memory Z4052 that corresponds to x coordinate=0 is rewritten with the HL coefficient of a coefficient memory Z4053, accompanied by the decoding of the coefficient.

Further, the flag bit (most significant bit) that corresponds to the consecutive length has been raised, so the consecutive length number decoding means decodes the consecutive length number from the input code Z403, and stores it in a consecutive length number memory Z4051.

In such a manner, the LH, HL, and HH coefficient values of the identical hierarchy/coordinate (0,0) in the subband memory Z401 are stored in the coefficient memory Z4053, and the status of each memory becomes Z405.

The inverse-wavelet transforming means reads out a coefficient value Z406 that corresponds to the coordinate (0,0) from the subband memory Z401, and performs a two-dimensional HAAR inverse-wavelet transforming process for it together with the LH, HL, and HH coefficient values of the coefficient memory Z4053. The 0LL component obtained as a result of the inverse-wavelet transform is outputted as pixels A, B, C, D, E, F, G, H, I, J, k, and L within an image memory Z402.

The process in a coordinate (1,0) is shown in Z407 and Z408.

At first, it is determined by the consecutive length means whether the consecutive length number is non-zero.

The consecutive length number is three in (1,0), so the consecutive length number is decremented to two, and a consecutive length number memory Z4071 is updated. Further, a previous-line coefficient memory Z4072 that corresponds to x coordinate=1 is transcribed to the HL coefficient value of a coefficient memory Z4073.

In such a manner, the LH, HL, and HH coefficients values of the identical hierarchy/coordinate (1,0) in the subband memory Z401 are stored in the coefficient memory Z4073, and the status of each memory becomes Z407.

The inverse-wavelet transforming means reads out the coefficient value Z408 that corresponds to the coordinate (1,0) from the subband memory Z401, and performs the two-dimensional HAAR inverse-wavelet transforming process for it together with the LH, HL, and HH coefficient values of the coefficient memory Z4073. The 0LL component obtained as a result of the inverse-wavelet transform is outputted to the image memory Z402.

Up to a coordinate (2,0) to a coordinate (3,0), the consecutive length process is performed similarly to the coordinate (1,0). The consecutive length number is sequentially decremented, and becomes zero at the time of completing the process in (3,0).

The process in a coordinate (4,0) is shown in Z409 and Z412.

At first, it is determined by the consecutive length means whether the consecutive length number is non-zero. The consecutive length number is zero in (4,0), so the consecutive length process is not performed.

The flag information encoding means reads out a variable-length code Z409, and decodes flag information Z4101.

The significant coefficient decoding means and the consecutive length number decoding means perform the decoding process as shown in Z410 with the method similar to Z404.

The value of the flash information memory Z4101 is EAh in the coordinate (4,0). The bit of FLHY (second most significant bit) has been raised, so a coefficient value 3 decoded from the input code Z409 is obtained, and the coefficient value 3 is stored in the Y component of the LH coefficient within a coefficient memory Z4113. Likewise, the bit of FLHU (third most significant bit), the bit of LHV (third most significant bit), the bit of FHLU (fifth most significant bit), the bit of HLV (fifth most significant bit), and the bit of FHHU (seventh most significant bit) have been raised, so a U component=2 of the LH coefficient, a V component=0 of the LH coefficient, a U component=4 of the HL coefficient, a V component=0 of the HL coefficient, and a U component=2 of the HH coefficient are decoded from the input code Z409, and stored in the U component and the V component of the LH coefficient, and the U component and the V component of the HL coefficient, and the U component of the HH coefficient within the coefficient memory Z4113, respectively. The zero value is stored in the components other these because the bit has not been raised.

Further, a previous-line coefficient memory Z4112 that corresponds to x coordinate=0 is rewritten with the HL coefficient of the coefficient memory Z4113, accompanied by the decoding of the coefficient.

Further, the flag bit (most significant bit) that corresponds to the consecutive length has been raised, so the consecutive length number decoding means decodes the consecutive length number from the input code Z409, and stores it in a consecutive length number memory Z4111.

In such a manner, the LH, HL, and HH coefficients of the identical hierarchy/coordinate (4,0) in the subband memory Z401 are stored in the coefficient memory Z4113, and the status of each memory becomes Z411.

The inverse-wavelet transforming means reads out a coefficient value Z412 that corresponds to the coordinate (4,0) from the subband memory Z401, and performs the two-dimensional HAAR inverse-wavelet transforming process for it together with the LH, HL, and HH coefficient values of the coefficient memory Z4113. The 0LL component obtained as a result of the inverse-wavelet transform is outputted to the image memory Z402.

When the process above is completed with respect to all coordinates, the final image is outputted to the file.

The foregoing present invention is applicable to an application such as a high-speed and yet a high-quality image delivery service. Further, it is also applicable to an application in which the document image accumulated in a network scanner, a FAX composite machine, etc. is remotely perused in a high-image quality and yet at high speed.

This application is based upon and claims the benefit of priority from Japanese patent application No. 2006-187364, filed on Jul. 7, 2006, the disclosure of which is incorporated herein in its entirety by reference.

The invention claimed is:

1. An encoding device, comprising:
   a wavelet transforming means for dividing a two-dimensional signal into subbands each of which is a plurality of frequency domains;
   a coefficient extracting means for extracting each component of each coefficient, which corresponds to an identical space coordinate, from an LH subband, an HL subband, and an HH subband belonging to an identical hierarchy, and constituting sets of the coefficients for each of space coordinates;
   a significant coefficient determining means for, for each of said sets of said coefficients, performing a process of determining whether or not one pre-designated component or more of one pre-designated subband or more is zero, thereby to generate one-bit determination information, respectively, and combining the determination information for each of said sets of said coefficients, thereby to generate flag information having a plural-bit length;
   a flag information encoding means for subjecting said flag information to variable-length encoding for each of said sets of said coefficients; and
   a significant coefficient encoding means for, for each of said sets of said coefficients, subjecting the component of which a value is not zero to the variable-length encoding with respect to the components of the coefficients for which said determining process has been performed, and when the components of the coefficients for which said determining process has not been performed exist, subjecting them to the variable-length encoding irrespective of zero/non-zero.

2. The encoding device according to claim 1, wherein:
   said encoding device comprises:
   a consecutive length determining means for, for each of said sets of said coefficients, determining whether or not all components of all coefficients are zero, and counting the number of times of consecutive appearance of a case that all components of all coefficients are zero as a consecutive length number; and
   a consecutive length number encoding means for, whenever said consecutive length number is settled, subjecting the consecutive length number to the variable-length encoding;
   said flag information encoding means, whenever said consecutive length number is settled, generates and subjects flag information of said set of said coefficients of which the consecutive length has been interrupted to the variable-length encoding; and
   said significant coefficient encoding means, whenever said consecutive length number is settled, subjects the component of which a value is not zero to the variable-length encoding with respect to the components of the coefficients for which said determining process has been performed, and when the components of the coefficients for which said determining process has not been performed exist, subjects them to the variable-length encoding irrespective of zero/non-zero.

3. The encoding device according to claim 1, wherein:
said encoding device comprises:
a consecutive length determining means for, for each of said sets of said coefficients, counting up the consecutive length number when all components of the coefficients of the LH subband and the HH subband are equal to all components of the coefficients extracted just before in a horizontal direction, and yet all components of the coefficients of the HL subband are equal to all components of the coefficients extracted just before in a vertical direction; and
a consecutive length number encoding means for, whenever said consecutive length number is settled, subjecting the consecutive length number to the variable-length encoding;
said flag information encoding means, whenever said consecutive length number is settled, generates and subjects flag information of said set of said coefficients of which the consecutive length has been interrupted to the variable-length encoding; and
said significant coefficient encoding means, whenever said consecutive length number is settled, subjects the component of which a value is not zero to the variable-length encoding with respect to the coefficients and the components for which said determining process has been performed, and when the coefficients and the components for which said determining process has not been performed exist, subjects them to the variable-length encoding irrespective of zero/non-zero.

4. The encoding device according to claim 1, wherein said designated subband in said significant coefficient determining means includes the LH subband, the HL subband, and the HH subband.

5. The encoding device according to claim 1, wherein said designated component in said significant coefficient determining means includes all components constituting the coefficient.

6. The encoding device according to claim 1, wherein said designated subband and component in said significant coefficient determining means include color difference components of the LH subband, color difference components of the HL subband, and a brightness component and color difference components of the HH subband.

7. The encoding device according to claim 1, wherein said significant coefficient determining means, in the determining process of the designated subband, determines whether or not either of a plurality of the color difference components are zero, thereby to generate one-bit determination information.

8. The encoding device according to claim 7, wherein said significant coefficient determining means, in the determining process of the LH subband and the HL subband, determines whether or not either of a plurality of the color difference components are zero, thereby to generate one-bit determination information, respectively.

9. The encoding device according to claim 2, wherein:
said significant coefficient determining means, whenever the consecutive length number is settled by said consecutive length determining means, generates determination information as to whether or nor the settled consecutive length number is zero, generates determination information of the designated subband and the designated component in a consecutive length starting coordinate, and combines these items of the determination information as flag information; and
said consecutive length number encoding means, whenever said consecutive length number is settled, subjects the consecutive length number to the variable-length encoding only when the consecutive length number is not zero.

10. The encoding device according to claim 1, wherein a base function of said wavelet transforming means is HAAR.

11. A decoding device into which coefficients of plural subbands obtained with a wavelet transform are inputted as a coding sequence, comprising:
a coefficient decoding means for, from said coding sequence of said subband, decoding each component of each coefficient corresponding to an identical space coordinate of an LH subband, an HL subband and a HH subband belonging to an identical hierarchy, and constituting sets of the coefficients for each of space coordinates; wherein
said coefficient decoding means comprises:
a flag information decoding means for, each of said sets of said coefficients, decoding flag information indicative of the component of the coefficient of which a value becomes zero; and
a significant coefficient decoding means for, based upon the flag information, decoding a variable-length code with respect to the component of the coefficient of which a value is not zero; and
said flag information includes an aggregation of respective items of one-bit determination information for determining whether or not one pre-designated component or more of one pre-designated subband or more is zero for each of said set of said coefficients.

12. The decoding device according to claim 11, further comprising:
a consecutive length number decoding means for, whenever said coefficient decoding means performs a decoding process, decoding the consecutive length number, and storing it in a consecutive length number memory; and
a consecutive length means for decreasing a value of said consecutive length number memory and outputting all components of all coefficients as zero without the decoding process performed by said coefficient decoding means when the value of said consecutive length number memory is not zero.

13. The decoding device according to claim 11, further comprising:
a consecutive length number decoding means for, whenever said coefficient decoding means performs a decoding process, decoding the consecutive length number, and storing it in a consecutive length number memory; and
a consecutive length means for decreasing a value of said consecutive length number memory, and outputting values identical to that of each component of the LH subband coefficient and the HH subband coefficient decoded just before in a horizontal direction as values of each component of the LH subband coefficient and the HH subband coefficient and yet outputting values identical to that of each component of the HL subband coefficient decoded just before in a vertical direction as values of each component of the HL subband coefficient without the decoding process performed by said coefficient decoding means when the value of said consecutive length number memory is not zero.

14. The decoding device according to claim 11, wherein said designated subband in said flag information includes the LH subband, the HL subband, and the HH subband.

15. The decoding device according to claim 11, wherein said designated component in said flag information includes all components constituting the coefficient.

16. The decoding device according to claim 11, wherein said designated subband and component in said flag information includes color difference components of the LH subband, color difference components of the HL subband, and a brightness component and color difference components of the HH subband.

17. The decoding device according to claim 11, wherein said flag information includes respective items of one-bit determination information indicating whether or not either of a plurality of color difference components are zero in the designated subband.

18. The decoding device according to claim 17, wherein said flag information includes respective items of one-bit determination information indicating whether or not either of a plurality of color difference components are zero in the LH subband and the HL subband.

19. The decoding device according to claim 12, wherein:
said flag information includes one-bit determination information indicating whether or not the consecutive length number is zero; and
said consecutive length number decoding means decodes the consecutive length number only when it has been determined from said flag information that the consecutive length number is not zero.

20. The decoding device according to claim 11, wherein a base function of said wavelet transforming means is HAAR.

21. An encoding method, comprising:
a first step of dividing a two-dimensional signal into subbands each of which is a plurality of frequency domains;
a second step of extracting each component of each coefficient, which corresponds to an identical space coordinate, from an LH subband, an HL subband, and an HH subband belonging to an identical hierarchy, and constituting sets of the coefficients for each of space coordinates;
a third step of, for each of said sets of said coefficients, performing a process of determining whether or not one pre-designated component or more of one pre-designated subband or more is zero, thereby to generate one-bit determination information, respectively, combining the determination information for each of said sets of said coefficients, thereby to generate flag information having a plural-bit length, and subjecting the above generated flag information to variable-length encoding; and
a fourth step of, for each of said sets of said coefficients, subjecting the component of which a value is not zero to the variable-length encoding with respect to the components of the coefficients for which said determining process has been performed, and when the components of the coefficients for which said determining process has not been performed exist, subjecting them to the variable-length encoding irrespective of zero/non-zero.

22. The encoding method according to claim 21, wherein:
said encoding method comprises:
a fifth step of, for each of said sets of said coefficients, determining whether or not all components of all coefficients are zero, and counting the number of times of consecutive appearance of a case that all components of all coefficients are zero as a consecutive length number; and
a sixth step of, whenever said consecutive length number is settled, subjecting the consecutive length number to the variable-length encoding;
in said third step, flag information of said set of said coefficients of which the consecutive length has been interrupted is generated and subjected to the variable-length encoding whenever said consecutive length number is settled; and
in said fourth step, whenever said consecutive length number is settled, with respect to the components of the coefficients for which said determining process has been performed, the component of which a value is not zero is subjected to the variable-length encoding, and when the components of the coefficients for which said determining process has not been performed exist, they are subjected to the variable-length encoding irrespective of zero/non-zero.

23. The encoding method according to claim 21, wherein:
said encoding method comprises:
a fifth step of, for each of said sets of said coefficients, counting up the consecutive length number when all components of the coefficients of the LH subband and the HH subband are equal to all components of the coefficients extracted just before in a horizontal direction, and yet all components of the coefficients of the HL subband are equal to all components of the coefficients extracted just before in a vertical direction; and
a sixth step of, whenever said consecutive length number is settled, subjecting the consecutive length number to the variable-length encoding;
in said third step, whenever said consecutive length number is settled, flag information of said set of said coefficients of which the consecutive length has been interrupted is generated and subjected to the variable-length encoding; and
in said fourth step, whenever said consecutive length number is settled, with respect to the coefficients and the component for which said determining process has been performed, the component of which a value is not zero is subjected to the variable-length encoding, and when the coefficient and the components for which said determining process has not been performed exist, they are subjected to the variable-length encoding irrespective of zero/non-zero.

24. A decoding method, comprising:
a first step of decoding each component of each coefficient corresponding to an identical space coordinate of an LH subband, an HL subband and a HH subband belonging to an identical hierarchy from coding sequences of plural subbands obtained with a wavelet transform, and constituting sets of the coefficients for each of space coordinates; wherein
said first step comprises:
a flag information decoding step of, for each of said sets of said coefficients, decoding flag information indicative of the component of the coefficient of which a value becomes zero; and
a significant coefficient decoding step of, based upon the flag information, decoding a variable-length code with respect to the component of the coefficient of which a value is not zero; and
said flag information includes an aggregation of respective items of one-bit determination information for determining whether or not one pre-designated component or more of one pre-designated subband or more is zero for each of said sets of said coefficients.

25. The decoding method according to claim 24, comprising:

a second step of decoding the consecutive length number and storing it in a consecutive length number memory; and a third step of decreasing a value of said consecutive length number memory and outputting all components of all coefficients as zero instead of the decoding process in said first step when the value of said consecutive length number is not zero.

26. The decoding method according to claim 24, comprising:
a second step of decoding the consecutive length number and storing it in a consecutive length number memory; and a third step of decreasing a value of said consecutive length number memory, and outputting values identical to that of each component of the LH subband coefficient and the HH subband coefficient decoded just before in a horizontal direction as values of each component of the LH subband coefficient and the HH subband coefficient and yet outputting values identical to that of each component of the HL subband coefficient decoded just before in a vertical direction as values of each component of the HL subband coefficient instead of the decoding process in the said first step when the value of said consecutive length number memory is not zero.

27. A non-transitory computer readable medium storing a program of encoding, said program being executed by an information processing device to cause said information processing device to perform operations comprising:
a first process of dividing a two-dimensional signal into subbands each of which is a plurality of frequency domains;
a second process of extracting each component of each coefficient, which corresponds to an identical space coordinate, from an LH subband, an HL subband, and an HH subband belonging to an identical hierarchy, and constituting sets of the coefficients for each of space coordinates;
a third process of, for each of said sets of said coefficients, performing a process of determining whether or not one pre-designated component or more of one pre-designated subband or more is zero, thereby to generate one-bit determination information, respectively, combining the determination information for each of said sets of said coefficients, thereby to generate flag information having a plural-bit length, and subjecting the above generated flag information to variable-length encoding; and
a fourth process of, for each of said sets of said coefficients, subjecting the component of which a value is not zero to the variable-length encoding with respect to the components of the coefficients for which said determining process has been performed, and when the components of the coefficients for which said determining process has not been performed exist, subjecting them to the variable-length encoding irrespective of zero/non-zero.

28. The non-transitory computer readable medium storing a program of encoding according to claim 27, wherein:
said program of encoding causes said information processing device to execute:
a fifth process of, for each of said sets of said coefficients, determining whether or not all components of all coefficients are zero, and counting the number of times of consecutive appearance of a case that all components of all coefficients are zero as a consecutive length number; and a sixth process of, whenever said consecutive length number is settled, subjecting the consecutive length number to the variable-length encoding;
in said third process, flag information of said set of said coefficients of which the consecutive length has been interrupted is generated and subjected to the variable-length encoding whenever said consecutive length number is settled; and
in said fourth process, whenever said consecutive length number is settled, with respect to the components of the coefficients for which said determining process has been performed, the component of which a value is not zero is subjected to the variable-length encoding, and when the components of the coefficients for which said determining process has not been performed exist, they are subjected to the variable-length encoding irrespective of zero/non-zero.

29. The non-transitory computer readable medium storing a program of encoding according to claim 27, said program of encoding being executed by said information processing device to cause said information processing device to perform operations comprising:
a fifth process of, for each of said sets of said coefficients, counting up the consecutive length number when all components of the coefficients of the LH subband and the HH subband are equal to all components of the coefficients extracted just before in a horizontal direction, and yet all components of the coefficients of the HL subband are equal to all components of the coefficients extracted just before in a vertical direction; and
a sixth process of, whenever said consecutive length number is settled, subjecting the consecutive length number to the variable-length encoding;
in said third process, whenever said consecutive length number is settled, flag information of said set of said coefficients of which the consecutive length has been interrupted is generated and subjected to the variable-length encoding; and
in said fourth process, whenever said consecutive length number is settled, with respect to the coefficients and the components for which said determining process has been performed, the component of which a value is not zero is subjected to the variable-length encoding, and when the coefficient and the components for which said determining process has not been performed exist, they are subjected to the variable-length encoding irrespective of zero/non-zero.

30. A non-transitory computer readable medium storing a program of decoding, said program being executed by
an information processing device to cause said information processing device to perform operations comprising:
a first process of decoding each component of each coefficient corresponding to an identical space coordinate of an LH subband, an HL subband and a HH subband belonging to an identical hierarchy from coding sequences of plural subbands obtained with a wavelet transform, and constituting sets of the coefficients for each of space coordinates; wherein
said first process comprises:
a flag information decoding process of, for each of said sets of said coefficients, decoding flag information indicative of the component of the coefficient of which a value becomes zero; and
a significant coefficient decoding process of, based upon the flag information, decoding a variable-length code with respect to the component of the coefficient of which a value is not zero; and said flag information includes an aggregation of respective items of one-bit determination information for determining whether or not one pre-designated component or more of one pre-designated subband or more is zero for each of said sets of said coefficients.

31. The non-transitory computer readable medium storing a program of decoding according to claim 30, causing said information processing device to execute:
   a second process of decoding the consecutive length number and storing it in a consecutive length number memory; and
   a third process of decreasing a value of said consecutive length number memory and outputting all components of all coefficients as zero instead of the decoding process in said first process when the value of said consecutive length number memory is not zero.

32. The non-transitory computer readable medium storing a program of decoding according to claim 30, said program being executed by said information processing device to cause said information processing device to perform operations comprising:
   a second process of decoding the consecutive length number and storing it in a consecutive length number memory; and
   a third process of decreasing a value of said consecutive length number memory, and outputting values identical to that of each component of the LH subband coefficient and the HH subband coefficient decoded just before in a horizontal direction as values of each component of the LH subband coefficient and the HH subband coefficient and yet outputting values identical to that of each component of the HL subband coefficient decoded just before in a vertical direction as values of each component of the HL subband coefficient instead of the decoding process in said first step when the value of said consecutive length number memory is not zero.

33. A non-transitory record medium having a program of encoding recorded therein, which is readable by an information processing device, causing said information processing device to execute said program to perform operations comprising:
   a first process of dividing a two-dimensional signal into subbands each of which is a plurality of frequency domains;
   a second process of extracting each component of each coefficient, which corresponds to an identical space coordinate, from an LH subband, an HL subband, and an HH subband belonging to an identical hierarchy, and constituting sets of the coefficients for each of space coordinates;
   a third process of, for each of said sets of said coefficients, performing a process of determining whether or not one pre-designated component or more of one pre-designated subband or more is zero, thereby to generate one-bit determination information, respectively, combining the determination information for each of said sets of said coefficients, thereby to generate flag information having a plural-bit length, and subjecting the above generated flag information to variable-length encoding; and
   a fourth process of, for each of said sets of said coefficients, subjecting the component of which a value is not zero to the variable-length encoding with respect to the components of the coefficients for which said determining process has been performed, and when the components of the coefficients for which said determining process has not been performed exist, subjecting them to the variable-length encoding irrespective of zero/non-zero.

34. A non-transitory record medium having a program of decoding recorded therein, which is readable by an information processing device,
   causes said information processing device to execute said program to perform operations comprising:
   a first process of decoding each component of each coefficient corresponding to an identical space coordinate of an LH subband, an HL subband and a HH subband belonging to an identical hierarchy from coding sequences of plural subbands obtained with a wavelet transform, and constituting sets of the coefficients for each of space coordinates; wherein
   said first process comprises:
   a flag information decoding process of, for each of said sets of said coefficients, decoding flag information indicative of the component of the coefficient of which a value becomes zero; and
   a significant coefficient decoding process of, based upon the flag information, decoding a variable-length code with respect to the component of the coefficient of which a value is not zero; and
   said flag information includes an aggregation of respective items of one-bit determination information for determining whether or not one pre-designated component or more of one pre-designated subband or more is zero for each of said sets of said coefficients.

\* \* \* \* \*